(12) United States Patent
Hildreth

(10) Patent No.: US 8,472,665 B2
(45) Date of Patent: Jun. 25, 2013

(54) CAMERA-BASED USER INPUT FOR COMPACT DEVICES

(75) Inventor: Evan Hildreth, Ottawa (CA)

(73) Assignee: QUALCOMM Incorporated, San Diego, CA (US)

( * ) Notice: Subject to any disclaimer, the term of this patent is extended or adjusted under 35 U.S.C. 154(b) by 1393 days.

(21) Appl. No.: 12/114,381

(22) Filed: May 2, 2008

(65) Prior Publication Data

US 2008/0273755 A1 Nov. 6, 2008

Related U.S. Application Data

(60) Provisional application No. 60/916,063, filed on May 4, 2007.

(51) Int. Cl.
*G06K 9/20* (2006.01)
*G06K 9/34* (2006.01)

(52) U.S. Cl.
USPC .......................................................... 382/103

(58) Field of Classification Search
USPC ................. 382/103, 114–116, 181, 191, 195, 382/203; 345/156, 158, 169, 173–175, 358, 345/473; 715/860, 863; 348/208.14
See application file for complete search history.

(56) References Cited

U.S. PATENT DOCUMENTS

| 5,164,992 | A | 11/1992 | Turk et al. |
| 5,168,531 | A * | 12/1992 | Sigel ............................ 382/291 |
| 5,454,043 | A | 9/1995 | Freeman |
| 5,534,917 | A | 7/1996 | MacDougall |
| 5,827,942 | A | 10/1998 | Madsen et al. |
| 6,115,482 | A * | 9/2000 | Sears et al. ..................... 382/114 |
| 6,147,678 | A * | 11/2000 | Kumar et al. ................. 345/158 |
| 6,204,852 | B1 | 3/2001 | Kumar et al. |
| 6,289,112 | B1 * | 9/2001 | Jain et al. ...................... 382/116 |
| 6,434,255 | B1 | 8/2002 | Harakawa |
| 6,526,156 | B1 | 2/2003 | Black et al. |
| 6,897,854 | B2 | 5/2005 | Cho et al. |
| 6,993,451 | B2 | 1/2006 | Chang et al. |
| 7,058,204 | B2 | 6/2006 | Hildreth et al. |
| 7,162,059 | B2 | 1/2007 | Yoo et al. |

(Continued)

FOREIGN PATENT DOCUMENTS

CN 1570973 A 1/2005
JP 2000187551 A 7/2000

(Continued)

OTHER PUBLICATIONS

International Search Report and Written Opinion—PCT/US2008/062456—ISA/EPO—Sep. 2, 2008.

(Continued)

*Primary Examiner* — Amir Alavi
(74) *Attorney, Agent, or Firm* — Kilpatrick Townsend & Stockton LLP

(57) ABSTRACT

A camera is used to detect a position and/or orientation of an object such as a user's finger as an approach for providing user input, for example to scroll through data, control a cursor position, and provide input to control a video game based on a position of a user's finger. Input may be provided to a handheld device, including, for example, cell phones, video games systems, portable music (MP3) players, portable video players, personal data assistants (PDAs), audio/video equipment remote controls, and consumer digital cameras, or other types of devices.

28 Claims, 17 Drawing Sheets

U.S. PATENT DOCUMENTS

| | | |
|---|---|---|
| 7,227,526 B2 | 6/2007 | Hildreth et al. |
| 7,340,077 B2 * | 3/2008 | Gokturk et al. .............. 382/103 |
| 7,665,041 B2 * | 2/2010 | Wilson et al. ................. 715/860 |
| 8,154,529 B2 * | 4/2012 | Sleeman et al. ............. 345/173 |
| 2003/0004678 A1 | 1/2003 | Zhang et al. |
| 2004/0207600 A1 | 10/2004 | Zhang et al. |
| 2005/0041841 A1 | 2/2005 | Yoo et al. |
| 2005/0238201 A1 | 10/2005 | Shamaie |
| 2006/0007170 A1 | 1/2006 | Wilson et al. |
| 2006/0008149 A1 | 1/2006 | Tu et al. |
| 2006/0177103 A1 | 8/2006 | Hildreth |
| 2006/0188849 A1 | 8/2006 | Shamaie |
| 2006/0192782 A1 | 8/2006 | Hildreth |
| 2006/0210146 A1 | 9/2006 | Gu |
| 2006/0281453 A1 | 12/2006 | Jaiswal et al. |
| 2007/0262965 A1 * | 11/2007 | Hirai et al. .................... 345/173 |
| 2008/0005703 A1 | 1/2008 | Radivojevic et al. |
| 2008/0246734 A1 * | 10/2008 | Tsui et al. ..................... 345/169 |
| 2008/0273755 A1 * | 11/2008 | Hildreth ....................... 382/103 |
| 2010/0177937 A1 * | 7/2010 | Zhang et al. ................. 382/115 |
| 2010/0328227 A1 * | 12/2010 | Matejka et al. ............... 345/173 |

FOREIGN PATENT DOCUMENTS

| | | |
|---|---|---|
| JP | 2000222097 A | 8/2000 |
| JP | 2001100906 A | 4/2001 |
| JP | 2002049455 A | 2/2002 |
| JP | 2003346162 A | 12/2003 |
| JP | 2006285370 A | 10/2006 |

OTHER PUBLICATIONS

Newlaunches.com, Samsung SCH-V960 first mobile phone with an optical joystick, available at http://www.newlaunches.com/archives/samsung_schv960_first_mobile_phone_with_an_optical_joystick.php, posted on Dec. 19, 2006, 2 pages.

Unwired View, Samsung SCH V960 Optical Joystick phone. How does it work?, available at http://www.unwiredview.com/2006/12/19/samsung-sch-v960-optical-joystick-phone-how-does-it-work/, posted on Dec. 19, 2006, 8 pages.

* cited by examiner

CAMERA-BASED USER INPUT FOR COMPACT DEVICES

CROSS REFERENCE TO RELATED APPLICATIONS

This application claims the benefit of U.S. Provisional Patent Application No. 60/916,063, filed May 4, 2007, which is incorporated herein by reference in its entirety.

FIELD

The present disclosure generally relates to user input, and at least one particular arrangement is directed to utilizing a camera to detect a position of a user's fingertip as a mechanism for providing user input.

BACKGROUND

Handheld devices, including cell phones, may include one or more mechanisms for user input, such as a keypad, a joystick, or a scroll wheel. Some handheld devices emulate a joystick function using an optical sensor and some handheld devices include a touch-sensitive display screen. Input mechanisms for handheld devices are typically limited to two dimensions of control.

SUMMARY

The present disclosure generally relates to user input, and at least one particular arrangement is directed to a novel approach for utilizing a camera to detect a position of a user's fingertip as a mechanism for providing user input.

According to one general implementation, a camera is used to detect a position and/or orientation of an object such as a user's finger as an approach for providing user input, for example to scroll through data, control a cursor position, and provide input to control a video game based on a position of a user's finger. Input is provided to a handheld device, including, for example, cell phones, video games systems, portable music (MP3) players, portable video players, personal data assistants (PDAs), audio/video equipment remote controls, and consumer digital cameras, or other types of devices. Handheld devices may include a camera, so additional hardware may not be required to implement the system for providing user input.

According to another general implementation, a method includes detecting an orientation of a finger of a user's hand in an image of the user's hand interacting with an electronic device using an anatomical model of a finger. The method also includes mapping the detected orientation to a control input, and controlling an application based on the control input.

Implementations may include one or more of the following features. For example, the method may further include detecting a position of the finger of the user's hand in the image of the user's hand interacting with the electronic device, where the control input may be mapped based on the detected position. The control input may define a position and an orientation in a virtual environment that corresponds to the detected position and detected orientation of the finger. The method may include controlling a virtual object in the virtual environment to move to the position and the orientation in the virtual environment that corresponds to the detected position and detected orientation of the finger, and rendering a display of the virtual object at the position and the orientation in the virtual environment that corresponds to the detected position and detected orientation of the finger.

Detecting the orientation of the finger of the user's hand in the image of the user's hand interacting with the electronic device using the anatomical model of the finger may include identifying a first part of the finger that corresponds to the fingertip, identifying a second part of the finger that corresponds to a base of the finger, calculating a vector between the first part of the finger and the second part of the finger, and determining the orientation of the finger based on the vector. The method also may include acquiring an image of the finger, and edge processing the image. Further, the method may include segmenting the image in scanlines having an orientation that is substantially perpendicular to the finger.

In some implementations, the method may further include detecting contours around the finger. The contours around the finger may be detected by calculating a gradient of image intensity within the image and identifying at least one of local minima and local maxima in the gradient of image intensity. The method may include identifying an area of the image that corresponds to creases in skin of the finger and ignoring the identified area of the image that corresponds to the creases in the skin of the finger in detecting the finger within the image.

In some examples, the method may include selecting an object in the image as the finger based on a size of the object, a shape of the object, and whether the object intersects a border of the image. The method further may include detecting the orientation of the finger using an anatomical model of a finger oriented in a plane parallel to a display of the electronic device, the anatomical model being a model of a finger extending from a base of the finger to a tip of the finger.

According to another general implementation, a device includes an image detector configured to detect an orientation of a finger of a user's hand in an image of the user's hand interacting with an electronic device using an anatomical model of a finger. The device also includes a processor configured to map the detected orientation to a control input and control an application based on the control input. The image detector may be disposed in a mobile phone, a portable video game system, a portable music player, a personal data assistant, a remote control or a digital camera.

According to another general implementation, a computer readable medium stores a computer program product. The computer program product includes instructions that, when executed, operate to cause a computer to perform operations. The operations include detecting an orientation of a finger of a user's hand in an image of the user's hand interacting with an electronic device using an anatomical model of a finger. The operations also include mapping the detected orientation to a control input, and controlling an application based on the control input.

According to another general implementation, a method includes accessing an image of a user's hand interacting with an electronic device, and identifying an object in the image as a finger of the user's hand based on a size of the object, a shape of the object, and whether the object intersects a border of the image. The method also includes determining a position of the object identified in the image as the finger of the user's hand, mapping the detected position to a control input, and controlling an application based on the control input.

Implementations may include one or more of the following features. For example, the method may include identifying the object in the image as the finger of the user's hand based on the object having an elongated shape that corresponds to an anatomical model of a finger. The method further may include identifying the object in the image as the finger of the user's hand based on an anatomical model of a finger oriented in a plane parallel to a display of the electronic device. The anatomical model may be a model of a finger extending from a base of the finger to a tip of the finger.

In some implementations, the method may include mapping the detected position to a position in a display region that corresponds to the detected position of the finger, and moving a displayed indicator to the position in the display region that corresponds to the detected position of the finger. The method also may include identifying an input control at a position in a displayed user interface that corresponds to the detected position of the finger and determining an operation associated with the identified input control. Controlling the application based on the control input may include performing the operation associated with the identified input control.

In some examples, the method may include determining a width of the finger in the image, and estimating a depth position of the finger with respect to a camera that captured the image based on the determined width. In these examples, the control input may be mapped based on the estimated depth position. The method further may include detecting a part of the finger that corresponds to the fingertip, and determining the position as a centroid of the part of the finger that corresponds to the fingertip.

The method may include defining an image region within the image such that borders of the image region are spaced apart from borders of the image by a distance of at least one half of an expected fingertip width, where the position of the finger may be detected within the defined image region. A position of the fingertip may be mapped to a position on a border of the image region when the fingertip is detected outside of the image region.

According to another general implementation, a device includes a camera configured to capture an image of a user's hand interacting with an electronic device. The device also includes a processor configured to access the image of the user's hand interacting with the electronic device, and identify an object in the image as a finger of the user's hand based on a size of the object, a shape of the object, and whether the object intersects a border of the image. The processor is further configured to determine a position of the object identified in the image as the finger of the user's hand, map the detected position to a control input, and control an application based on the control input.

According to another general implementation, a computer readable medium stores a computer program product. The computer program product includes instructions that, when executed, operate to cause a computer to perform operations. The operations include accessing an image of a user's hand interacting with an electronic device, and identifying an object in the image as a finger of the user's hand based on a size of the object, a shape of the object, and whether the object intersects a border of the image. The operations also include determining a position of the object identified in the image as the finger of the user's hand, mapping the detected position to a control input, and controlling an application based on the control input.

The details of one or more implementations are set forth in the accompanying drawings and the description below. Other potential features and advantages of the disclosure will be apparent from the description and drawings.

DESCRIPTION OF DRAWINGS

Like reference symbols in the various drawings indicate like elements.

DETAILED DESCRIPTION

According to one general implementation, a camera is used to detect a position of an object such as a user's fingertip as an approach for providing user input. For example, detection of a position of a user's fingertip may be used to scroll through data, control a cursor position, and provide input to control a video game based on the position of a user's fingertip. Additional information, such as the orientation of the finger also may be detected. Input is provided to a handheld (or other) device, including, for example, cell phones, video games systems, portable music (MP3) players, portable video players, personal data assistants (PDAs), audio/video equipment remote controls, and consumer digital cameras, or other types of devices. Handheld devices may include a camera, so additional hardware may not be required to implement the system for providing user input.

Figure 1:
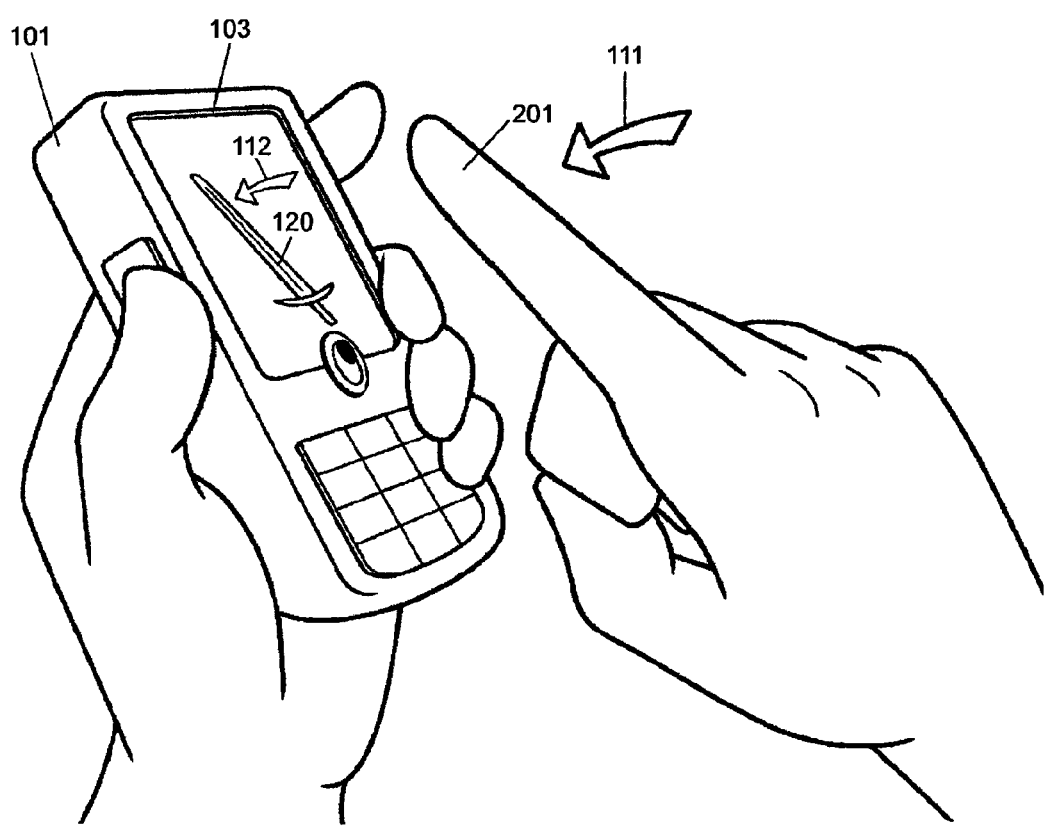
FIG. 1 is a contextual diagram demonstrating detection of a position of a user's fingertip as an approach for providing user input.

FIG. 1 is a contextual diagram demonstrating detection of a position of a user's fingertip as an approach for providing user input. A handheld device 101 (described in more detail below) includes a display 103 that displays output of an application or an operating system being run on the handheld device 101. A user provides user input to the handheld device 101 using the user's finger 201. As shown, the application is a melee combat game and controlling the game is achieved using a user input approach that maps a finger position and orientation to a representation of a virtual object 120 (e.g., a sword).

For example, movements 111 of the user's finger 201 are mapped to movements 112 of the virtual object 120 (e.g., a sword or other weapon) within the game. In this example, the game displays a representation of the virtual object 120 using three-dimensional computer graphic techniques, whereby the virtual object 120 has a position and orientation within a virtual volume. A finger base position within an image region or a three-dimensional image region is mapped to a virtual object base position within a virtual volume, and a finger orientation is mapped to a virtual object orientation within the virtual volume. In this regard, the position and orientation of the virtual object 120 corresponds to the position and orientation of the user's finger 201 such that the user's finger 201 maps to the virtual object 120.

Using this mapping, a user, for example, waves his finger 201 to the right to provide user input to the game to cause the sword 120 to slash to the right. The user also may orient his finger 201 in a plane parallel to a plane representing the front surface of the display 103 with the user's fingertip pointing in a direction perpendicular to a topmost edge of the display 103. Such an orientation of the user's finger 201 causes the sword 120 to appear, in the virtual environment, to be in a plane parallel to a plane representing the front surface of the display 103 with the tip of the sword 120 pointing in a direction perpendicular to the topmost edge of the display 103. If the user moves his finger 201 upward (i.e., in a direction perpendicular to the topmost edge of the display 103) while maintaining the orientation, user input is provided to the game causing the sword 120 to thrust upward in the display in a manner corresponding to the user's finger 201.

Similarly, if the user moves his finger 201 toward the display while maintaining the orientation, the sword 120 maintains the orientation corresponding to the user's finger 201 and navigates in the virtual environment in a direction into the display. If the user moves his finger 201 away from the display while maintaining the orientation, the sword 120 maintains the orientation corresponding to the user's finger 201 and navigates in the virtual environment in a direction out of the display. As such, changes of a position of the user's finger 201 map to changes of a position of the virtual object (i.e., the sword) 120 in the virtual environment, which are represented by changes in the display of the virtual object 120 on the display 103.

In some examples, a user may change the orientation of the user's finger 201 to change an orientation of the sword 120 in the virtual environment. For instance, the user may tilt his finger 201 to cause the sword 120 to tilt in the virtual environment. The sword 120 may tilt in the virtual environment a particular number of degrees that directly or proportional corresponds to the number of degrees with which the user tilted his finger 201. As such, changes of an orientation of the user's finger 201 map to changes of an orientation of the virtual object (i.e., the sword) 120 in the virtual environment, which are represented by changes in the display of the virtual object 120 in the display 103.

Changes to a position and orientation of the user's finger 201 both may be mapped to a position and orientation of the sword 120 in the virtual environment. In this regard, a user may tilt or rotate his finger 201 toward the display to cause the sword 120 to slash in the virtual environment in a direction into the display by tilting or rotating the sword 120 in a manner corresponding to movement of the user's finger 201 (e.g., in a manner corresponding to the tilt or rotation of the user's finger 201 toward the display). The user also may point his finger 201 at the display and move his finger 201 toward the display while pointing his finger 201 at the display. This movement may cause the sword 120 to thrust in a direction into the display. In some examples, a depth sensing camera (e.g., a stereo camera or a time-of-flight camera) may be used to detect a distance of the user's finger 201 from the camera.

The application (i.e., the melee combat game) compares the position and orientation of the virtual object 120 within the virtual environment (e.g., virtual volume) with other virtual objects in the virtual environment to control game play. Based on the comparison, the application (i.e., the melee combat game) determines if the virtual object 120 intersects with a virtual target object (e.g., a virtual character, another virtual weapon, a target, etc.). The virtual target object also may be rendered on the display. Displaying the virtual target object on the display allows the user to move his finger 201 toward or at the virtual target object to cause the virtual object 120 to move in the virtual environment in a corresponding manner, and, thus, intersect the virtual target object. Mapping the position and orientation of the user's finger 201 to the position and orientation of the virtual object 120 allows a user to control the melee combat game using his finger 201.

Figure 2:
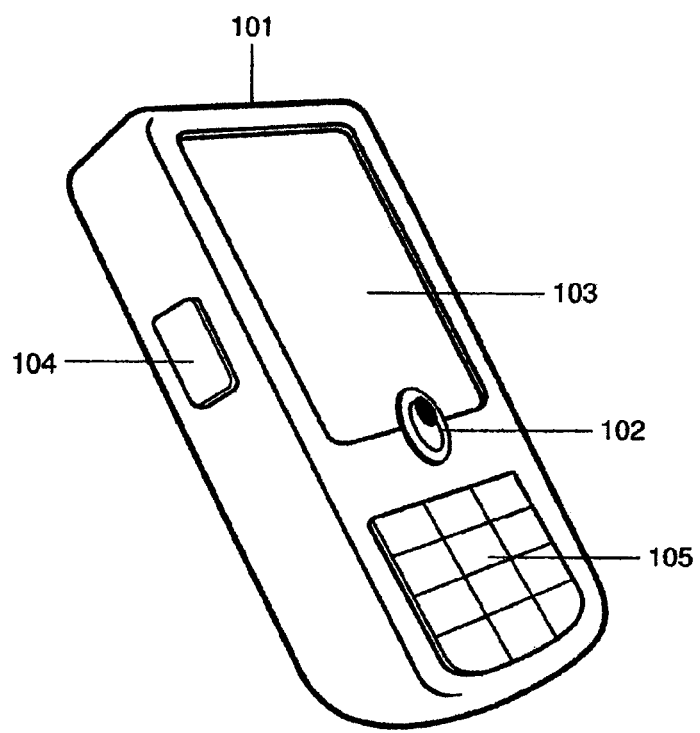
FIG. 2 illustrates an exemplary handheld device.

Referring to FIG. 2, a handheld device 101 includes a camera 102 and a display 103 (such as an LCD screen) that provides a visual display for an application. The handheld device 101 also may include a button 104 or a keypad 105. An internal processor is configured to accept input from the camera 102, the button 104, and/or the keypad 105, perform a function or operation based on the input, and render an image on the display 103.

The camera 102 is a device that captures images. For example, the camera 102 may be a digital camera, a digital video camera, or any other type of device that captures images. The device 101 may include one or more cameras. The camera 102 may capture images of a physical object interacting with an application. For instance, the camera 102 may capture images of a user's finger or fingertip physically interacting with an application within the field of view of the camera 102.

The camera 102 further may include an emitter that illuminates the finger 201, so that the camera may detect the finger in low ambient light. An emitter may produce infrared light, and the camera 102 may be sensitive to infrared light. Alternatively, the emitter may produce visible light (e.g., white light), and the camera 102 may be sensitive to visible light. In place of an emitter, the display screen 103 may emit light so that the finger 201 may be detected in low ambient light.

The camera 102 also may be a depth sensing camera. For example, the camera 102 may be a stereo camera that includes a plurality of sensors that obtain an image of the finger 201 from different viewpoints. The camera 102 may be capable of sensing depth by comparing the images of each viewpoint, or the device may calculate depth by detecting the finger 201 in each viewpoint and comparing the finger positions. In another example, the camera 102 may be a time-of-flight camera that includes an emitter that emits a pulse of light and a sensor capable of measuring the time the pulse of light is sensed. The time-of flight camera is capable of sensing depth by comparing the time a pulse of light is emitted to the time it is sensed, thereby measuring the length of the path taken by the light.

The display 103 renders a visual display to the user that may include text or images. The visual display may indicate information regarding the status of the device 101 or provide a visual interface for an application, such as a game or other application executing on the device 101. The display 103 also may display graphics, images, and text that comprise a user interface for the software applications in the described implementation, as well as the operating system programs necessary to operate the device 101.

The button 104 is an input control button a user may use to provide an input command to the device 101. The button 104 may correspond to a particular function that may or may not change based on an interface rendered on the display 103. The button 104 may be used to activate an input control program that enables a user to provide input to the device 101 based on movements of the user's finger captured in images taken by the camera 102. For instance, movement of a user's finger may be mapped to user input when the button 104 is depressed, but may be ignored when the button 104 is not depressed. Controlling activation of the user input program using the button 104 may prevent inadvertent movements of the user's finger (e.g., as the user removes the device 101 from his pocket or a bag) from being mapped to user input. Activation of the button 104 also may control the camera 102 to capture images and control the processor to perform other processes for use in mapping movement of a user's finger to user input.

A user of device 101 uses the keypad 105 to enter commands and data to operate and control the operating system programs as well as the application programs. The keypad 105 includes a group of one or more buttons or pressure activated switches that a user may activate to provide an input to the device 101. The keypad 105 may enable a user to enter text data and user commands into the device 101.

A processor (not shown) may accept input from the button 104 and the keypad 105 and may analyze images captured by the camera 102 to map movements of a user's finger to user input commands. The processor may perform a function or operation based on the user input, and may render a display on the display 103 in response to the user input when appropriate. The processor may execute application programs and operating systems being run on the handheld device 101. The handheld device 101 may include multiple processors (or other control circuitry) and may include memory (or other computer-readable storage media) that stores application programs, operating systems, user input programs, and data used by the application programs, operating systems, and user input programs.

Although device 101 is illustrated in FIG. 2 as a mobile device, in further aspects device 101 may include a component of a personal computer (PC) or gaming system, a laptop, a handheld or tablet computer, a personal data assistant ("PDA") or another type of embedded system such as a computer keyboard or a remote control. The device 101 also may be a portable music player, a beeper or other communication device, or a handheld or portable electronic device for gaming, communications, and/or data organization.

Figure 3A:
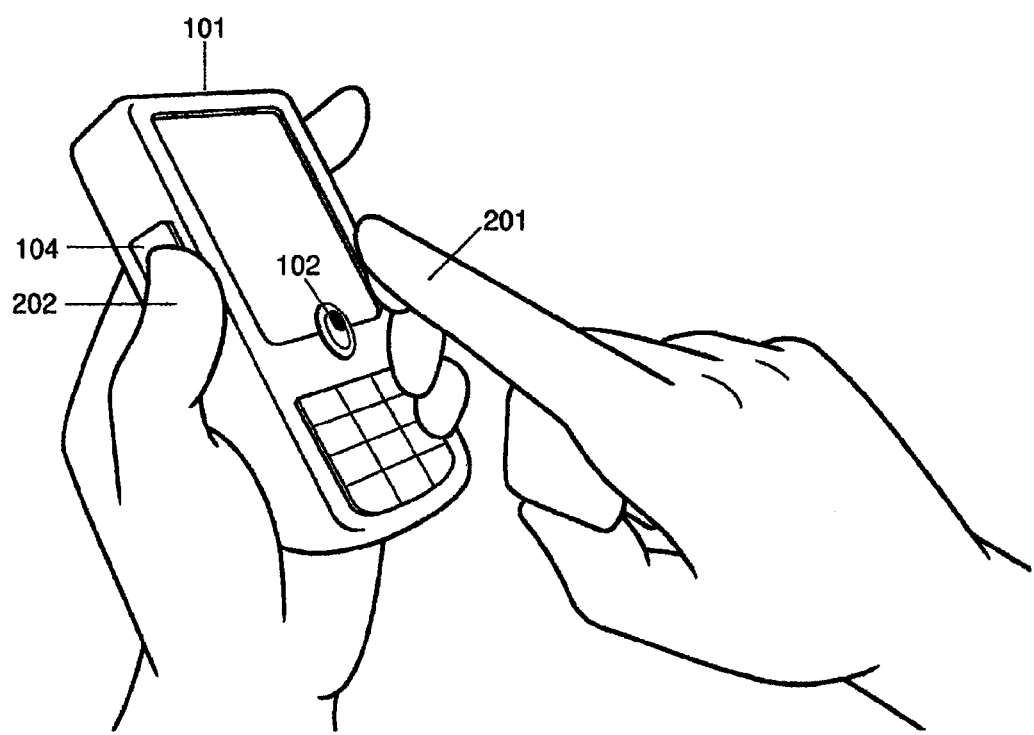
FIG. 3A illustrates another exemplary handheld device that includes a camera facing a user perceiving a display of the handheld device.

Referring to FIG. 3A, in one general implementation, the handheld device 101 includes a camera 102 that faces a user perceiving a display of the handheld device 101. In this implementation, the user holds his finger 201 above the handheld device 101, a short distance in front of the camera 102, to provide user input to the handheld device 101. The camera 102 may be positioned such that a field of view of the camera covers an area in front of the display. The user also uses his finger 202 to manipulate the button 104.

Figure 3B:
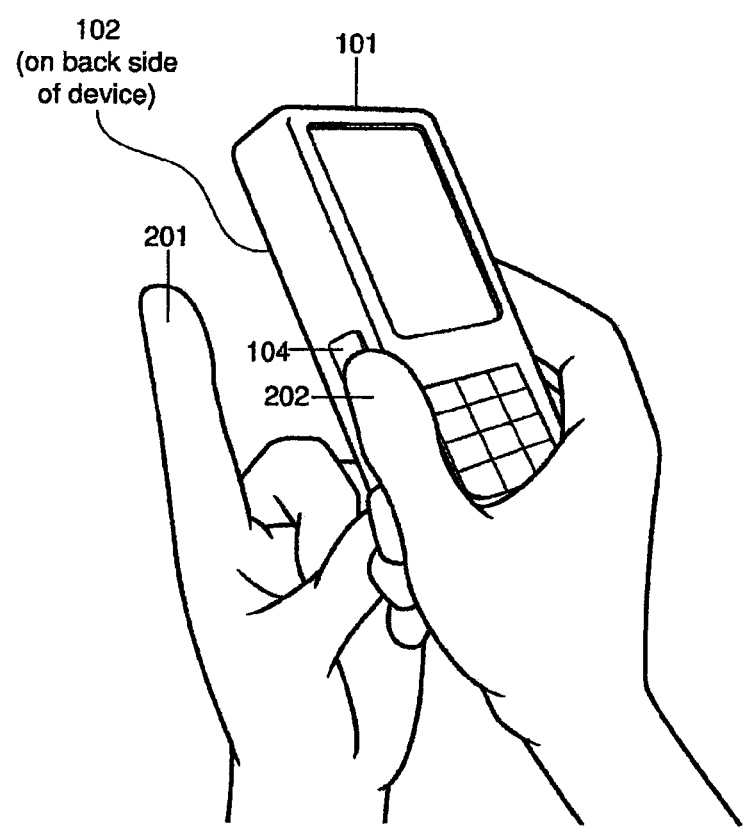
FIG. 3B illustrates another exemplary handheld device that includes a camera facing away from a user perceiving a display of the handheld device.

Referring to FIG. 3B, in another general implementation, the handheld device 101 includes a camera 102 that faces away from a user perceiving a display of the handheld device 101. In this implementation, the user holds his finger 201 under the handheld device 101, a short distance in back of the camera 102, to provide user input to the handheld device 101. As shown, the exposed portion of the camera 102 is on the back side of the handheld device 101 and hidden from view. The user also uses his finger 202 to manipulate the button 104. Although FIGS. 3A and 3B illustrate two example camera configurations, in other implementations a camera also may be disposed on any surface or side of the handheld device.

In the implementations shown in FIG. 3A and FIG. 3B, the user interacts with the handheld device 101 by moving a finger 201 within an area imaged by the camera 102. Additionally, the user may interact with the handheld device 101 by using his thumb 202 or another finger to press the button 104 or a key of the keypad 105.

The device may be held and/or operated in a variety of manners. For example, a user may hold the device with a first hand while using a finger of a second hand to point. In another example, a user may point with a finger of the same hand that is used to hold the device. In yet another example, the device may be stationary (e.g., resting on a table) and the user may point with any finger.

Figure 4:
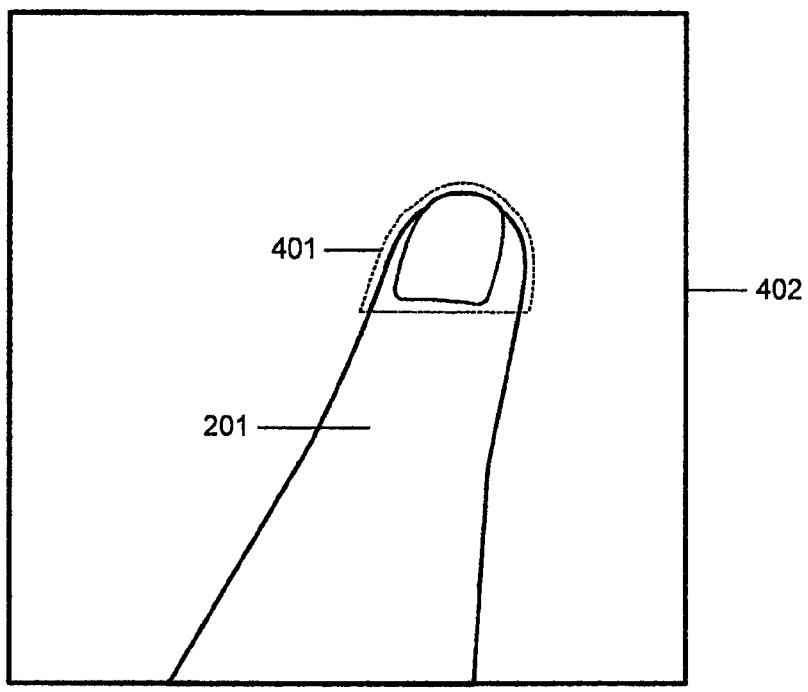
FIG. 4 illustrates an example of a position of a user's finger used for providing user input to a device.

FIG. 4 illustrates an example of a position of a user's finger 201 providing user input to a device. For example, the user holds a finger 201 so that the fingertip 401 is within the camera's field of view 402. The user's fingertip 401 may be a distance between 2 and 10 centimeters from the camera 102 (although lesser or greater distances also may be used). The camera 102 may be of a type and configuration commonly used for taking photographs and videos, and the finger 201 may still be used to provide user input if it is "out of focus." In particular, as described more fully below, a processor analyzes a camera image to segment the image of the finger 201. The processor calculates the orientation and the position of the fingertip 401 after segmenting the camera image.

Figure 5:
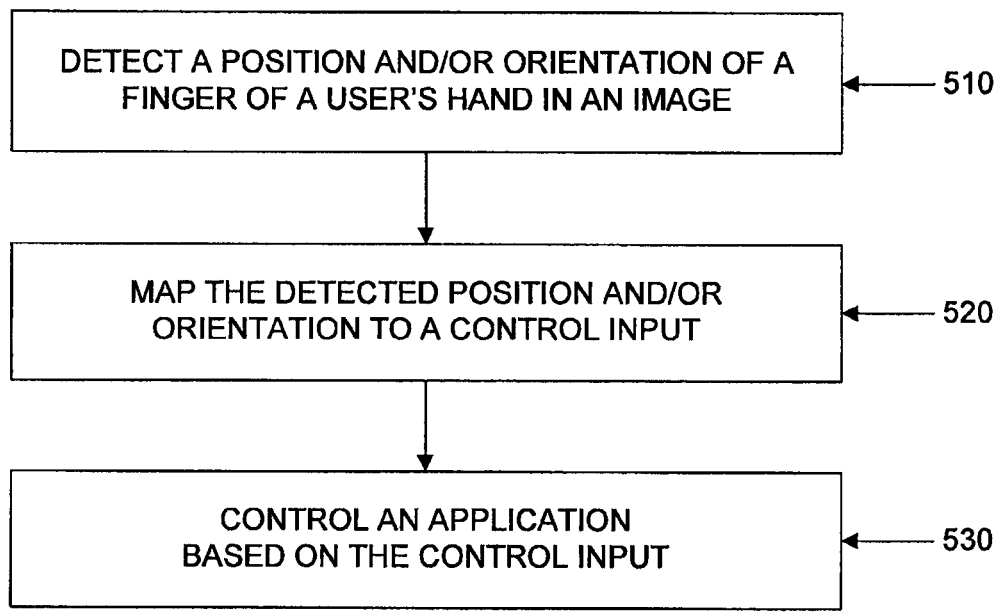
FIG. 5 is a flow chart illustrating a process of mapping a detected position and/or orientation of a finger to a control input and controlling an application based on the control input.

FIG. 5 is a flow chart illustrating a process 500 of mapping a detected position and/or orientation of a finger to a control input and controlling an application based on the control input. For convenience, particular components described with respect to FIGS. 2 to 4 are referenced as performing the process. However, similar methodologies may be applied in other implementations where different components are used to define the structure of the system, or where the functionality is distributed differently among the components shown by FIGS. 2 to 4.

A processor of the device 101 detects a position and/or orientation of a finger of a user's hand in an image of the user's hand interacting with an electronic device (510). For example, the processor 205 may process or analyze one or more accessed images to detect a user's finger in the accessed images. In this example, the processor may detect a finger by comparing features in the accessed images to typical features of fingers in images (e.g., an anatomical model of a finger) or may detect a finger by detecting motion in the accessed images. The processor also may detect a finger based on skin color analysis of the accessed images or may detect a finger by comparing current images including one or more fingers with a background model to detect differences between the current images and the background model. The processor 205 may use any type of technique to detect a finger within a single image or within a set of multiple images.

After detecting a finger in one or more images, the processor analyzes a portion of the one or more images to determine a position and/or an orientation of the detected finger. The processor may determine a position of the finger based on the area within the field of view of the camera in which the finger is detected and may determine an orientation of the finger based on an angle of the finger within the field of view of the camera. The processor may determine a position of the finger in two dimensions or three dimensions. When the position of the finger is determined in three dimensions, the processor may estimate a distance of the finger from the camera based on the size of the finger or may process images captured from a stereo or time-of-flight camera, which include depth information. Similarly, the processor may determine an orientation of the finger in two-dimensional space or three-dimensional space. In detecting a position and orientation of the finger, the processor may compute a vector that represents a position and orientation of a detected finger in three-dimensional space.

The processor maps the detected position and/or orientation to a control input (520). The processor may map the detected position and/or orientation of the finger to a control input based on a display rendered at the time of detecting the position and/or orientation. For example, the processor may compare the position and/or orientation of the finger to a position and/or orientation of items rendered in a displayed user interface. Based on the comparison, the processor may map the detected position and/or orientation of the finger to a particular command or operation associated with a displayed interface control (e.g., a displayed interface control that corresponds to the position and/or orientation of the finger).

The processor also may map the detected position and/or orientation to a position and/or orientation of an object displayed in a user interface. For instance, the processor may map the detected position and/or orientation to a position and/or orientation of a cursor (e.g., a mouse cursor) displayed in a user interface. As such, movement of the user's finger may be mapped to a movement of the cursor in the user interface to enable a user to control an application using the cursor.

The processor also may map the detected position and/or orientation to a position and/or orientation of a virtual object in a virtual environment. For example, as described above with respect to FIG. 1, the processor may map the detected position and/or orientation to a virtual object (e.g., a weapon in a melee combat game) in a virtual environment such that the position and/or orientation of the virtual object in the virtual environment corresponds to the detected position and/or orientation.

The processor further may map the detected position and/or orientation to a control input based on a gesture represented by the detected position and/or orientation. The processor may analyze movement (e.g., changing position and/or orientation) of a detected finger to determine whether a user has performed a gesture related to a control input. For instance, the processor may compare movement of the detected finger to a set of recognized gestures, detect performance of a recognized gesture based on the comparison, and map the movement (e.g., a finger position and/or orientation) to a control input associated with the recognized gesture. In one example, a user may move his finger in the shape of the letter 'Z' in front of the camera to provide input that turns the device 101 off or causes the device 101 to enter a sleep mode.

The processor controls an application based on the control input (530). For example, the processor may perform an operation or command in an application that corresponds to the control input. The processor may select a displayed interface control based on the control input or may control a displayed object (e.g., a cursor or virtual object) based on the control input. The control input may be related to a command or operation in a data processing application, a game, an operating system, a media application, a device control application, or any other type of application.

Figure 6:
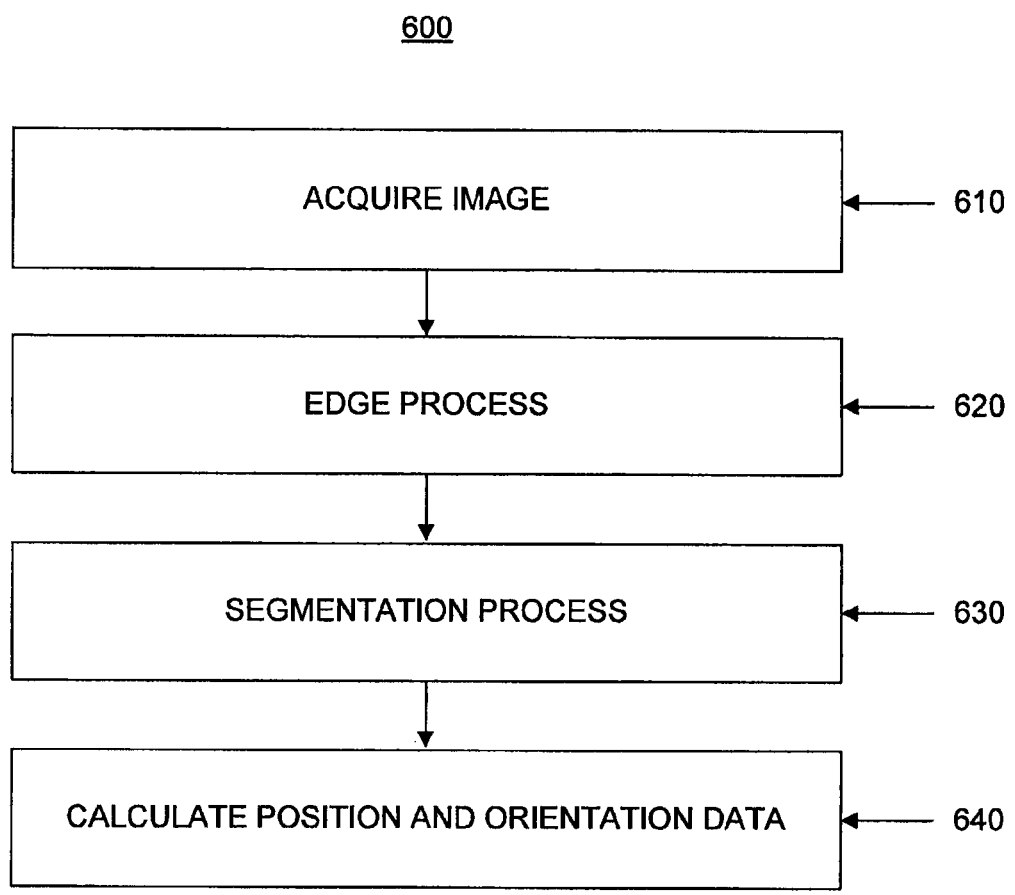
FIG. 6 is a flow chart of a process of utilizing a camera to detect a position of a user's fingertip as an approach for providing user input.

FIG. 6 is a flow chart illustrating a process 600 of utilizing a camera to detect a position and/or orientation of a user's fingertip as an approach for providing user input. The process 600 may be used in detecting a position and/or orientation of a finger based on an image, as described above with respect to numeral 510. For convenience, particular components described with respect to FIGS. 2 to 4 are referenced as performing the process. However, similar methodologies may be applied in other implementations where different components are used to define the structure of the system, or where the functionality is distributed differently among the components shown by FIGS. 2 to 4.

The processor of the handheld device 101 acquires a camera image from the camera 102 (610) and edge processes the camera image (620) to detect contours of the finger. Using the contours, the processor segments the camera image (630) to identify the finger. The processor calculates information indicating the finger's position and/or orientation (640) based on the identified finger.

In some implementations, devices (e.g., the camera 102) capture images in a color format where the color channels are packed (e.g., a 16-bit word contains 5-bits red, 6-bits green, and 5-bits blue). In one example implementation, acquiring the camera image (610) includes converting the camera image into a color format that is more efficient and convenient for the processing that follows. For example, the processor may convert the color format to 8-bit grayscale or 24-bit RGB color.

In other implementations, the finger appears blurry due to the proximity of the finger to the camera, and therefore high-frequency components in the image may not be attributable to the finger. In this situation, acquiring the camera image (610) further includes applying a low-pass filter to the image. Applying the low-pass filter may remove frequency components that are higher than those attributable to the finger and may reduce the magnitude of ancillary edges and the effects of signal noise.

In further implementations, a device (e.g., the camera 102) captures images in a resolution that is higher than what is required by the described process. Under these circumstances, acquiring the camera image (610) may include decimating the image. The method of decimation may include binning, whereby a decimated pixel value is calculated as the average of multiple pixel values within a region. The binning process may reduce the effects of signal noise because the average of the noise component over a region of multiple pixels tends to have lower magnitude than the noise component of the individual pixels within the region. Sub-sampling or another method of decimation may be used.

The edge detection process (620) detects the contours around the finger. An edge detection process calculates the gradient of the image intensity at each pixel. The processor may use a Sobel operation in the edge detection process. The Sobel operation convolves a pair of kernels with the original image to determine the horizontal and vertical components of the gradient. These kernel calculations are shown below in Equations 1A and 1B:

$$G_X = \begin{bmatrix} -1 & 0 & +1 \\ -2 & 0 & +2 \\ -1 & 0 & +1 \end{bmatrix} * A \quad (1A)$$

$$G_Y = \begin{bmatrix} +1 & +2 & +1 \\ 0 & 0 & 0 \\ -1 & -2 & -1 \end{bmatrix} * A \quad (1B)$$

In Equations 1A and 1B, A is the camera image and Gx and Gy are the horizontal and vertical gradient components. The horizontal and vertical components are combined. The combined result is calculated as the square root of the sum of the squared components, shown below in Equation 1C:

$$G = \sqrt{G_X^2 + G_Y^2} \quad (1C)$$

An approximation may be used that is more efficient. Using an approximation may enable processors typically employed on handheld devices to perform the necessary calculations. In an approximation, the combined result is calculated as the sum of the absolute values of the horizontal and vertical components, as shown below in Equation 1D:

$$G = a \times |G_X| + b \times |G_Y| \quad (1D)$$

In addition, the horizontal and vertical components may be multiplied by a predefined scalar a and b. The scalar a may or may not be larger than the scalar b. In some implementations, the scalar a may be larger than the scalar b, so that the system is more sensitive to the sides of the finger than to the creases of the skin. Other edge detection methods may be used in place of the Sobel operation.

As a result of the proximity of the finger to the camera, the finger may appear blurry in the camera image. The gradients forming the contour of the finger may span a width of several pixels. Features within the finger, such as creases of the skin, the cuticle, and the finger nail may also form edges, however the blurring may reduce the magnitude of those gradients.

In an implementation of a segmentation process (630), the camera image is processed in scanlines having an orientation. The orientation is selected to be approximately perpendicular to the finger, so that each scanline represents a cross-section of the finger. The orientation may or may not be predetermined. For example, the orientation may be based on the orientation of the camera 102 within the device 101 and the usual orientation in which the user is expected to hold the device.

Figure 7A:
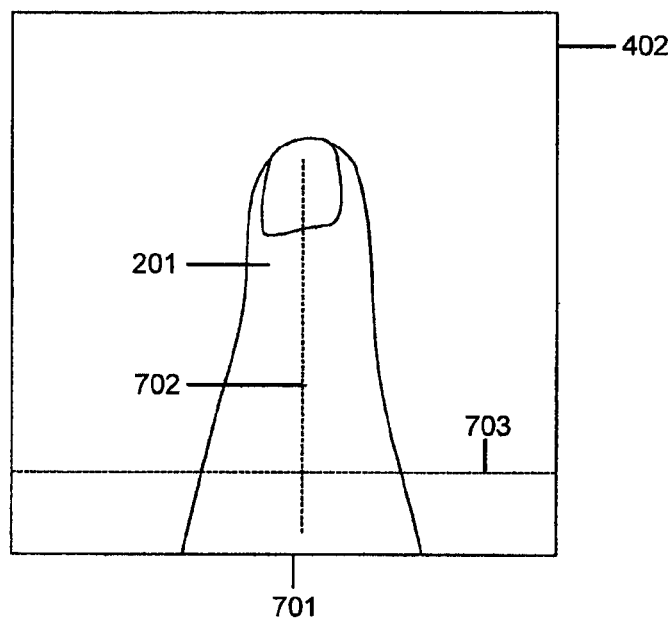
FIG. 7A illustrates an example in which a finger enters a field of view from a bottom image edge.

FIG. 7A illustrates an example in which the finger 201 enters the field of view 402 from a bottom image edge 701, such that the finger orientation 702 appears approximately vertical. In this example, a scanline 703 is defined as a horizontal row of pixels. Multiple parallel scanlines, spaced one pixel apart, are defined.

Figure 7B:
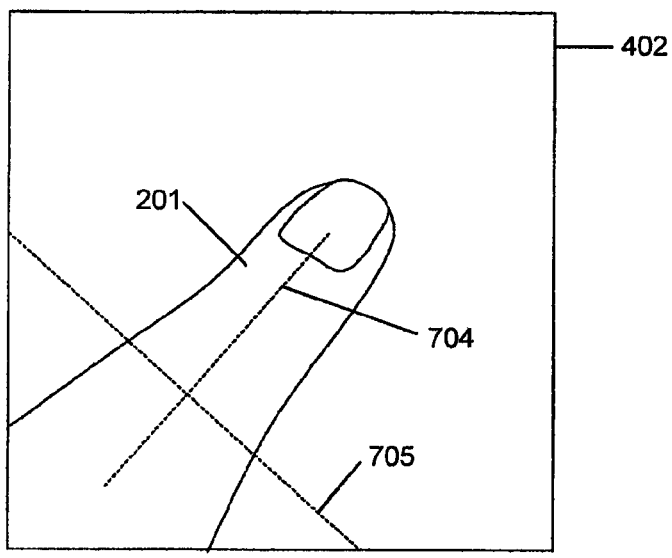
FIG. 7B illustrates an example in which a finger appears angled within a camera's field of view.

FIG. 7B illustrates an example in which the finger 201 appears angled within the camera's field of view 402. In this example, a scanline 705 is defined perpendicular to the finger orientation 704. Multiple parallel scanlines, spaced approximately one pixel apart, are defined.

In examples where the scanline orientation is angled, as shown in FIG. 7B, the processor rotates the camera image prior to edge processing. The rotation processing rotates the image data so that scanlines appear as horizontal rows of pixels within a rotated image buffer. In the rotated image buffer, the pixels on a scanline may have consecutive memory addresses, so that a transform is not used.

In other implementations where the scanline orientation is angled, as shown in FIG. 7B, the segmentation process uses a transform when accessing the gradient result for pixels of the scanline. The memory address of a pixel on a scanline may be calculated at the time the pixel value is accessed. A transform may or may not be computationally more efficient than rotating the image.

Figure 8A:
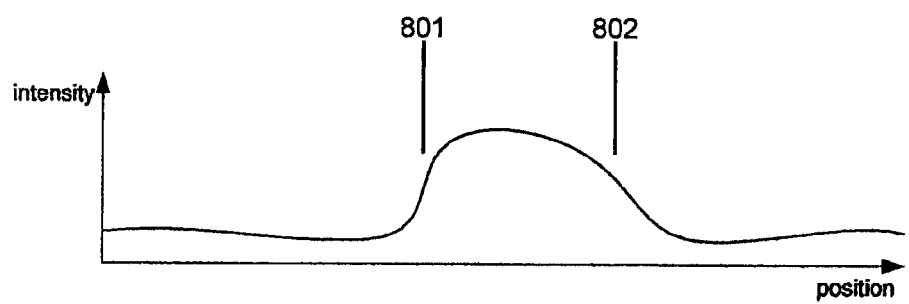
FIG. 8A illustrates an example of the intensity of pixels along a scanline.
Figure 8B:
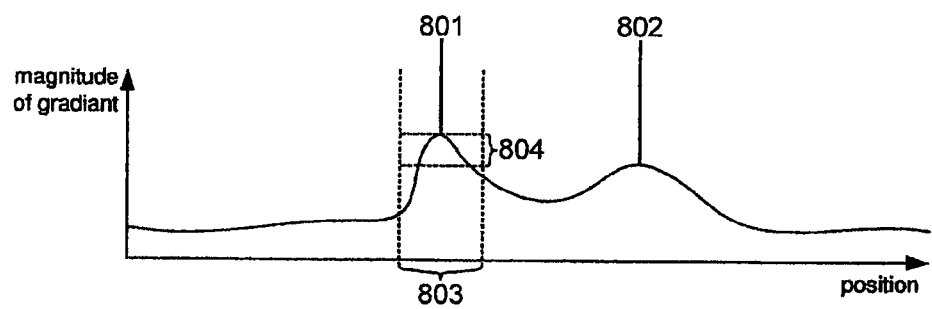
FIG. 8B illustrates an example of a magnitude of a gradient as calculated by an edge detection process.

FIG. 8A illustrates an example of the intensity of pixels along a scanline (e.g., scanline 703 of FIG. 7A), and FIG. 8B illustrates an example of the magnitude of the gradient as calculated by the edge detection process. The edges on either side of the finger are labeled as 801 and 802. As a result of the proximity of the finger to the camera, the finger may appear blurry in the camera image, which causes the slope of the edges to appear gradual as shown in FIG. 8B.

In segmenting the camera image (630), the processor identifies the local maxima and segments the scanline at the points of local maxima. A local maxima is identified as the maximum value within a region identified as 803, centered at the local maximum, and the value of which is greater than a surrounding value by at least a threshold value identified as 804. Scanline segments are linked to form a graph data structure. Segments are linked to segments of neighboring scanlines if the segments overlap.

Figure 9A:
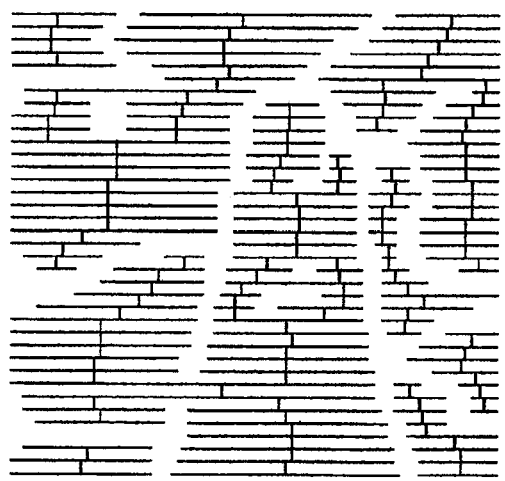
FIG. 9A illustrates an example of linked segments.

FIG. 9A illustrates an example of linked segments, where horizontal lines represent segments and vertical lines represent links. In this example, features within the background may also form edges. After forming a graph data structure including linked segments, the graph data structure may be pruned. In one example, the edges around the finger are incomplete, whereby a scanline segment includes part of a finger and part of a background. Sub-sets (e.g., regions) of the graph that are linked by relatively few segments (relative, for example, to the region's size) may be un-linked by pruning those segments that connect the sub-sets.

A set of linked segments are selected as the finger. The selection criteria includes size, shape, and intersection with the border of the camera image (or rotated image) where the finger is expected to enter the image (e.g., at the bottom image edge 701 as shown in FIG. 7A). A size criterion compares a pixel count to a predefined range. A shape criterion compares the ratio of width and height to a predefined range. A border intersection criterion determines if a set of linked segments includes segments of a pre-selected scanline.

The selection criteria may represent an anatomical model of a finger and the anatomical model of the finger may be compared to the set of linked segments to determine whether the set of linked segments is the finger. The anatomical model may include information defining typical properties of fingers in camera images, such as a typical size and a typical shape of a finger. The typical shape of a finger defined by the anatomical model may reflect an elongated shape of an extended finger from the base of the finger to the tip of the finger. The anatomical model also may include skin texture features, such as expected creases and expected areas of fingerprints. The anatomical model of the finger may represent the entire finger and include features such as joints of the finger, a connection of the finger to a hand, a fingernail, skin color, etc.

The anatomical model further may relate to a finger oriented in a manner in which a finger is held by a user in interacting with the device. For instance, in implementations in which a user interacts with a device by holding his or her finger in a plane parallel to a display of the device, the anatomical model may represent an anatomical model of a finger oriented in a plane parallel to the display of the device. Orienting the anatomical model in the manner in which a finger is held by a user in interacting with the device may facilitate detection of the finger in images of the user's finger interacting with the device.

In some implementations, multiple anatomical models of fingers with varying characteristics may be used. For instance, different sized anatomical models (e.g., adult and child models) or different gender models (e.g., male and female models) may be used to determine whether a set of linked segments is a finger. Specifically, each of the multiple anatomical models may be compared to the set of linked segments until a match is found or all of the models have been used and the set of linked segments is determined not to be a finger. Using multiple anatomical models may enable detection of fingers of a larger number of users.

When interacting with a device, users may hold their finger at different orientations with respect to the device. If the orientation of the user's finger in interacting with the device does not match the anatomical model, the user's finger may not be properly detected. Accordingly, anatomical models of a finger with varying orientations may be used to facilitate detection of fingers over a wider range of orientations. Comparing a set of linked segments to anatomical models with varying orientations also may be used in determining an orientation of the user's finger, which may be mapped to a control input.

In some arrangements, a finger registration process may be used to register a particular finger with a particular device. For instance, a user may provide identifying information to a device and control the device to capture one or more images of the user's finger. The device may generate an anatomical model that corresponds to the user's finger from the one or more captured images and store the anatomical model generated for the user's finger in association with information identifying the user. When the user subsequently uses the device and provides identification information (or is identified by the device in another manner), the device uses the anatomical model generated for the user's finger in detecting a position and/or orientation of the user's finger interacting with the device. Using an anatomical model generated specifically for a particular user's finger may facilitate detection of the user's finger.

Figure 9B:
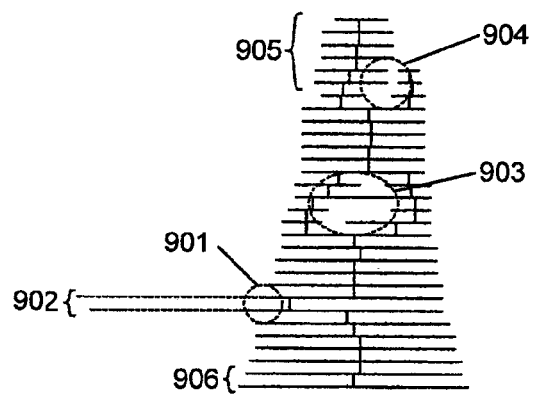
FIG. 9B illustrates an example of a set of linked segments identified as a finger.

FIG. 9B illustrates an example of a set of linked segments identified as a finger. Edges may not be detected at all positions around the finger's contour. For example, the position of the finger's contour indicated at 901 does not include a detected edge. As a result, the segments identified at 902 may be pruned (e.g., the parts indicated by a dashed line are removed). Edges are detected within the finger. For example, the edges identified at 903 were caused by the creases of the skin at the knuckle joints and the edges identified at 904 were caused by the finger nail or cuticle. The path of linked segments passes around these features.

The processor calculates a position and/or orientation information for the finger (640) from the selected set of linked segments. Segments near an end of the set (e.g., the segments indicated by 905 in FIG. 9B) are selected as a sub-set representing the fingertip. Segments near an end of the set (e.g., the segments indicated by 906 in FIG. 9B) are selected as a part of a sub-set representing the base of the finger. The sub-set of segments representing the fingertip or the base of the finger include segments within a predetermined number of scanlines of the furthest segment.

Figure 9C:
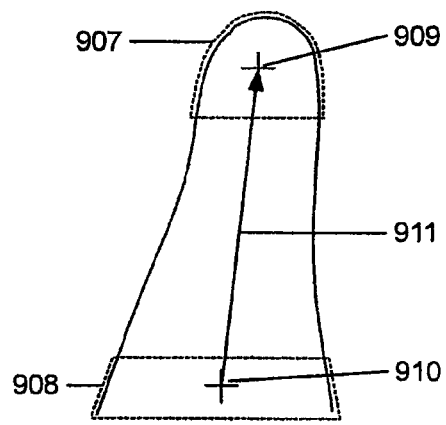
FIG. 9C illustrates an example of sub-sets representing portions of the finger.

FIG. 9C illustrates an example of sub-sets representing portions of the finger. The sub-set of segments near an end of the set are selected to represent the fingertip. For example, the sub-set 907 represents the fingertip. Segments near an end of the set are selected as a part of a sub-set representing the base of the finger. For example, the sub-set 908 represents the base of the finger.

The processor calculates a fingertip position 909 as the centroid of the identified fingertip part (e.g., sub-set) 907. The centroid may be calculated using floating-point precision or a fixed-point simulation of floating-point. The processor calculates the base position 910 as the centroid of the identified finger base part (e.g., sub-set) 908. The centroid may be calculated using floating-point precision or a fixed-point simulation of floating-point. Floating-point precision or a fixed-point simulation of floating-point allows a centroid to be calculated/estimated at a higher resolution than the camera image (or, where the image is decimated, a higher resolution than the decimated camera image). Accordingly, using floating-point precision or a fixed-point simulation of floating-point, may reduce processing power requirements by allowing the edge process 620 and the segmentation process 630 to process a lower resolution image. The reduction in processing power requirements may be appropriate for the processor capabilities of a typical handheld device.

The processor calculates the finger orientation 911 as the vector formed from the base position 910 to the fingertip position 909. In another implementation, the processor calculates the moments of a finger (e.g., a pruned set of selected linked segments) to determine the finger orientation. Additional characteristics, such as the average width of the finger, may optionally be calculated.

Figure 9D:
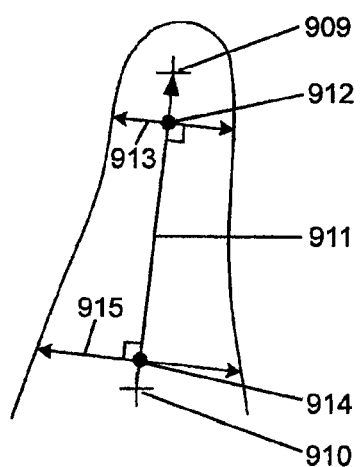
FIG. 9D illustrates an example of width measurements of a finger.

Referring to FIG. 9D, the width of the finger is measured perpendicular to the finger orientation 911, near the fingertip and the finger base. The fingertip width 913 is measured from a point on the finger orientation vector between the fingertip position and the base position. For example, the fingertip width 913 is measured at a point 912 located a predetermined distance from the fingertip. The predetermined distance is chosen to avoid the curvature of the fingertip and to avoid the finger-nail part of the finger. Avoiding the finger-nail part of the finger may be beneficial because the segmentation of that part of the finger may be less accurate. The finger base width 915 is measured from a point of the finger orientation vector between the fingertip position and the base position. For example, the finger base width 915 is measured at a point 914 located a predetermined distance from the base of the image (e.g., a pre-selected scanline).

A three-dimensional position and orientation may be optionally estimated using the finger width measurements. For example, the fingertip width 913 and the finger base width 915 may be compared to corresponding widths of an anatomical model of a finger to estimate depth dimensions (e.g., distances from the camera) of the finger. The fingertip width 913 is dependent on the distance of the fingertip from the camera. The measured fingertip width may be inversely mapped to distance. For example, a fingertip width of large magnitude is mapped to a short distance and a fingertip width of small magnitude is mapped to a far distance. The calculated distance is included as a component of a fingertip position coordinate. Likewise, the finger base width 915 is mapped to a finger base distance and included in a finger base position coordinate. A finger orientation is calculated as the vector formed from the finger base position to the fingertip position, including the mapped fingertip distance from the camera and the mapped finger base distance from the camera components of the coordinates. The segmentation processes described may be optimized to be computationally efficient and may be appropriate for the processor capabilities of a typical handheld device.

In another implementation of segmentation (630), the camera image is processed using a Watershed transformation. The edge (e.g., magnitude of gradient) data is parsed to identify local minima. A region is defined for each local minimum.

Each region is expanded, to include the connected pixels having a magnitude less than or equal to a value. This process is repeated for increasing values, until the set of regions are expanded to include all pixels of the image. Regions may be merged to form larger regions. A region is selected as the finger based on criteria (e.g., size, shape, and intersection with the border of the camera image where the finger is expected to enter the image) similar to that described above. The finger's position and orientation information is calculated from the selected region, similar to as described above.

Various implementations of the Watershed transform may be applied. The implementation of the Watershed transform chosen may be dependent on the processing capabilities of the device. For example, less computation intensive implementations of the Watershed transform may be used for devices with limited processing power. In addition, acquiring an image may include decimating an image (as described above) in order to reduce the processing requirements of the Watershed transform.

Other approaches may be used in processing camera images. For instance, a Condensation or Conditional Density Propagation process may be used. The Condensation or Conditional Density Propagation process is iterative. For instance, the Condensation process may be initialized with known finger segmentation data. Thereafter, the Condensation process predicts the finger segmentation in consecutive video frames or camera images as the finger moves. Each iteration of the Condensation process performs a selection, a prediction, and a measurement. The selection produces a set of potential states for evaluation using factored sampling. The predication estimates how the state of an object will change using a dynamic model. The measurement compares the predicted state with the actual pixel data. The Condensation process may be particularly robust in tracking objects in cluttered backgrounds, and may be useful for handheld devices because the number of iterations per video frame and number of pixels sampled in each iteration may be adjusted according to the processor capabilities of the handheld device. Kalman Filtering is another process that may be used in processing camera images.

The fingertip position coordinate space is transformed to correspond to the display 103 to provide an intuitive mapping between the user's finger motions and the display 103. In an implementation where the camera faces the user, as shown in FIG. 3A, the transformation includes a mirror transformation. In this implementation, the camera views the finger from the back side and the user views the finger and the display from the front side, such that mirroring the coordinate system allows the camera's view of the finger to correspond to the user's view of the finger and display. In an implementation where the scanline orientation is angled, as shown in FIG. 7B, the transformation includes a rotation by an angle inverse to the angle of the scanline orientation. In an implementation where the orientation of the camera 102 differs from the orientation of the display 103, the transformation corrects for the difference in orientation.

Figure 10A:
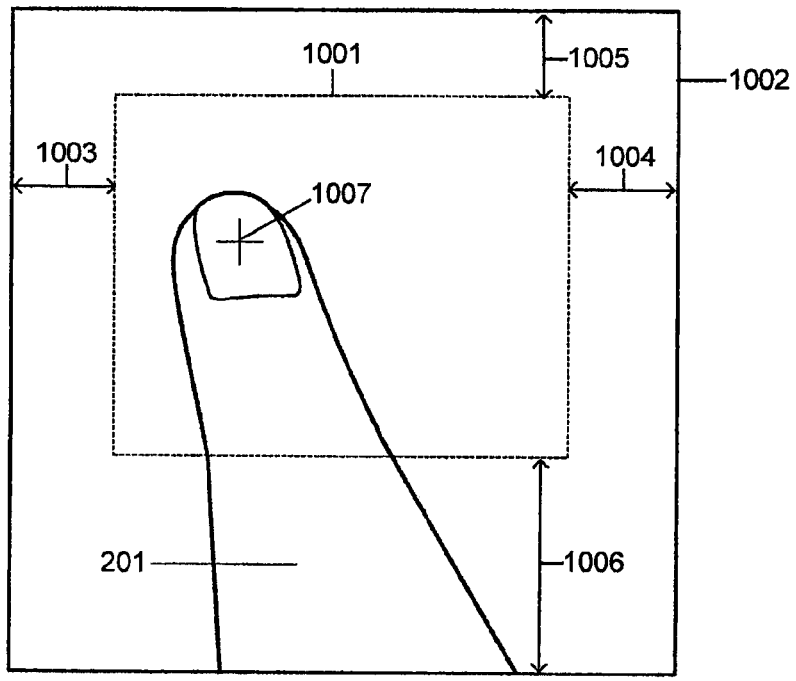
FIG. 10A illustrates an example of an image region defined within a camera image.

Referring to FIG. 10A, an image region 1001 is defined within the camera image 1002. The processor may define an image region 1001 and process the image region 1001 in detecting a position and/or orientation of a finger based on an image, as described above with respect to numeral 510.

In implementations where the fingertip position coordinate space transformation includes a rotation, the image region 1001 is rotated relative to the camera image 1002. The image region 1001 is defined so that the fingertip position 1007 can move to all positions within the image region 1001, including the region's bounds. For example, the minimum distance from the boundaries of the camera image 1002, as indicated by distances 1003, 1004, 1005, and 1006, is one half the expected fingertip width. This example results in an image region 1001 where the fingertip position 1007 can move to all positions within the image region 1001 because the fingertip position is in the center of the fingertip and the part of the fingertip between the fingertip position and the fingertip edge is approximately half the fingertip width. Additionally, the distance 1006 from the border of the camera image 1002 to the image region 1001 at the finger's base is chosen such that the finger selection criteria is satisfied.

Figure 10B:
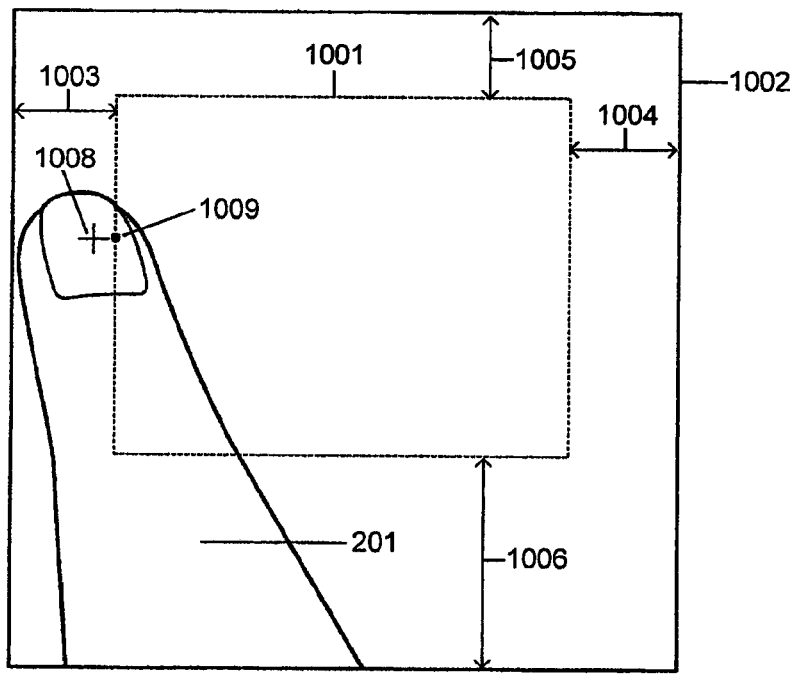
FIG. 10B illustrates an example of a finger positioned such that a fingertip position is outside of an image region.

FIG. 10B illustrates an example of a finger positioned such that a fingertip position 1008 is outside of an image region 1001. In this example, the fingertip position 1008 is mapped to the nearest position 1009 on the border of the image region 1001.

Figure 11A:
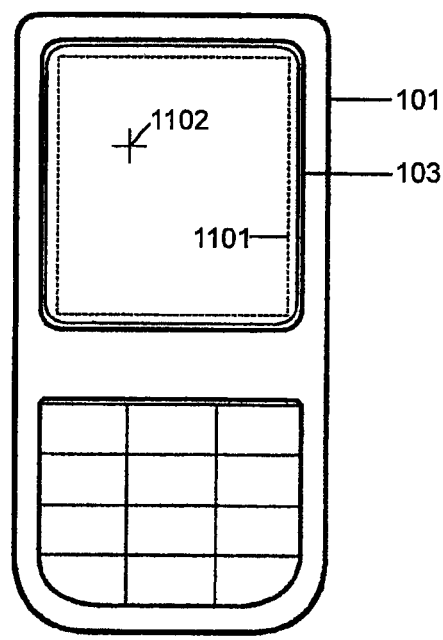
FIG. 11A illustrates an example of mapping an image region to a display region.

FIG. 11A illustrates an example of mapping an image region 1001 to a display region 1101 that is part of the display 103. Mapping an image region 1001 to a display region 1101 may be used in mapping a detected position and/or orientation to a control input, as described above with respect to numeral 520. The display region 1101 may include the entire display 103 or a part of the display 103. For example, the display region 1101 may include the active area of the display 103, excluding a status bar. A fingertip position 1007 relative to an image region 1001 is mapped to an indicator position 1102 relative to a display region 1101.

Figure 11B:
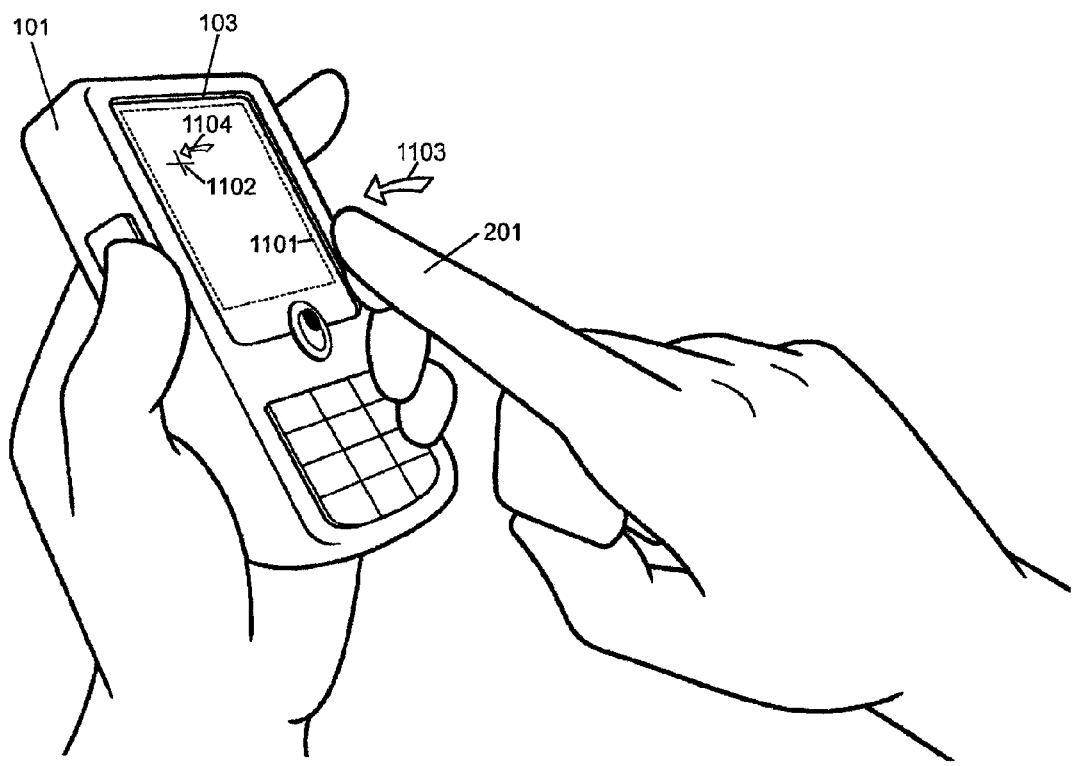
FIG. 11B illustrates an example in which an indicator position directly correlates to a position of a finger.

FIG. 11B illustrates an example in which the indicator position 1102 directly correlates to the position of the finger. For finger positions on a plane parallel to the display, a one-to-one correlation between the finger position and the indicator position exists. Movements 1103 of the finger 201 are mapped to similar movements 1104 of the indicator position 1102. For example, if a user places a finger at a first fingertip position, a first indicator position results. If the user moves his finger to a second fingertip position, a second indicator position results. In this example, if the user moves his finger so that it returns to the first fingertip position, the indicator also will return to the first indicator position. Users may find this to be more intuitive than a joystick. For example, a joystick applies a velocity to an indicator position such that the indicator position correlates to the state of the joystick in an indirect manner.

In another implementation, an image region is a three-dimensional region and the fingertip position includes a component representing a calculated distance from the camera. For example, the component representing the calculated distance from the camera is calculated using width measurements of the finger as described above. The three-dimensional image region is defined so that the fingertip position can move to all positions within a defined volume.

In one example, a fingertip is close to the camera and the camera has a limited range in which the camera images fingertip motion in the plane parallel to the display (e.g., a small movement could cause the fingertip to go outside the camera's field of view). In this example, the region's bounds are defined to include a range of distances from the camera where the field of view of the camera does not limit the area in which the camera images the fingertip below a threshold value.

A three-dimensional image region is mapped to a three-dimensional display region. A three-dimensional display region is part of a virtual volume, and rendered to the display 103 using three-dimensional computer graphic rendering techniques.

In some configurations, a fingertip position relative to a three-dimensional image region is mapped to an indicator position relative to a three-dimensional virtual volume. The indicator position directly correlates to the position of the finger. A one-to-one correlation between the finger position and the indicator position exists. Movements of the finger are mapped to similar movements of the indicator position within the virtual volume. For example, if a user places a finger at a first fingertip position, a first indicator position in the virtual volume results. If the user moves the finger to a second fingertip position, a second indicator position in the virtual volume results. In this example, if the user moves the finger so that it returns to the first fingertip position, the indicator also will return to the first indicator position in the virtual volume. The second indicator position may be different than the first indicator position in height, width, and depth dimensions in the virtual volume.

Figure 12:
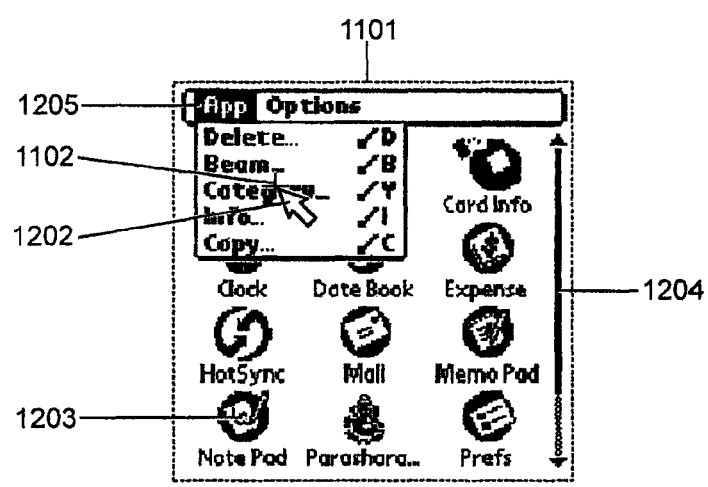
FIG. 12 illustrates an example of a user interface of an application displayed on a display screen.

FIG. 12 depicts an example of a user interface of an application displayed on a display screen 103. A display region 1101 is illustrated and a cursor image 1202 is displayed as an indicator at an indicator position 1102 corresponding to a fingertip position. The display image displays onscreen objects, including icons 1203, scroll bars 1204, menus 1205, and buttons (not shown) having an appearance and function similar to those on a personal computer, a handheld device, or any other type of electronic device. A position indicator based control function is analogous to a mouse cursor on a personal computer.

A user activates an onscreen object by positioning his fingertip so that the indicator position is within the bounds of an on-screen object, and clicking the button 104 or a key of the keypad 105. A user drags an on-screen object by positioning his fingertip so that the indicator position is within the bounds of an onscreen object, pressing and holding down the button 104 or a key of the keypad 105, moving his fingertip so that the indicator position moves, and releasing the button 104 or the key of the keypad 105.

In another implementation, a user activates an onscreen object by positioning his fingertip so that the indicator position is within the bounds of an onscreen object and performing a gesture. The gesture may be to move the fingertip closer to the camera, where the distance is reduced by an amount greater than a predefined threshold over a duration of time that is less than a predefined time limit. The distance of the fingertip is calculated using the width of the fingertip as discussed above. The indicator position at the time of the start of the gesture is used to determine the input because the user may inadvertently change the indicator position while performing the gesture.

An implementation of a process to detect a gesture includes storing the calculated fingertip distance (or alternatively, the fingertip size/width) in a buffer. The data is stored in a circular array data structure, whereby a new data sample replaces the oldest data sample. A data sample fingertip distance (or size/width) is compared to the current fingertip distance (or size/width), to determine if the data sample fingertip distance (or size/width) is closer than the current fingertip distance (or size/width) by a distance exceeding a pre-defined threshold distance.

In another implementation, the described techniques are adapted to enable a user to scroll through a displayed list. For example, a list includes multiple levels. In an implementation where the list is a list of contacts (e.g., addresses and phone numbers), a first level includes a list of letters of the alphabet, a second level includes a list of names filed under a letter, and a third level includes the information for a contact. In an implementation where the list is a list of songs (e.g., music), a first level includes a list of artists, a second level includes a list of albums (e.g., albums created by an artist), a third level includes a list of songs (e.g., songs included on an album), and a fourth level includes a song.

In an implementation where the list is a list of times and dates (e.g., a calendar), a first level includes a list of months, a second level includes a lists of days (e.g., days within a month), a third level includes times (e.g., times within a day), and a fourth level includes the information (e.g., appointments) at a time. In another implementation, where the list is a list of times and dates (e.g., a calendar), a first level includes a list of weeks, a second level includes a lists of days (e.g., days within a week), a third level includes times (e.g., times within a day), and a fourth level includes the information (e.g., appointments) at a time.

The horizontal component of the fingertip position 1007 within an image region 1001 controls the selection of a level of a list. An image region 1001 is divided into a number of columns corresponding to levels. An application is configured to display information according to the column in which the fingertip position is located. A user switches between levels by moving his fingertip left or right. The device may display an animation or play a sound to indicate a change of level to a user.

Within a level, a list of items is displayed where item indicators are arranged in a column. An item indicator may include text and/or an icon. The fingertip position 1007 within an image region 1001 is mapped to the bounds of the item indicator arrangement and compared to an item indicator position within the bounds of the item indicator arrangement. An item indicator at a position corresponding to the fingertip position is rendered to indicate that it is selected. For instance, an item indicator may be rendered in an alternate color (e.g., highlight) or an item indicator may be rendered in a larger size when the item indicator corresponds to the fingertip position. Other item indicators may move to make room for the larger size. The device also may play a sound to indicate a change of selection to a user.

In some implementations, the distance of the fingertip from the camera controls the selection of a level of a list. A pre-defined range of distance is divided by a number of levels. An application displays information according to a level corresponding to the distance of the fingertip from the camera. A user switches between levels by moving his fingertip closer to or further from the camera. The device may display an animation or play a sound to indicate a change of level to a user. A three-dimensional image region is defined and the distance component of the three-dimensional image region is divided into layers.

Within a level, a list of items is displayed where item indicators are arranged. Item indicators may be arranged in columns, rows, a grid or rows and columns, or an arbitrary arrangement. An item indicator may include text or an icon. The fingertip position 1007 within an image region 1001 is mapped to the bounds of the item indicator arrangement and compared to an item indicator position within the bounds of the item indicator arrangement. An item indicator at a position corresponding to the fingertip position is rendered to indicate that it is selected. For instance, an item indicator may be rendered in an alternate color (e.g., highlight) or an item indicator may be rendered in a larger size when the item indicator corresponds to the fingertip position. Other item indicators may move to make room for the larger size. The device also may play a sound to indicate a change of selection to a user.

In some arrangements, a user changes levels by changing an orientation of the user's finger. The user changes a level by rotating the user's finger within a plane parallel to the display 103. A user may select a first level by positioning his finger in plane parallel to the display 103 and orienting his finger to point in a direction toward nine o'clock. The user then may select a second level by rotating his finger to point in a direction in a direction toward twelve o'clock, and then select a third level by rotating his finger to point in a direction in a direction toward three o'clock.

Further, in some examples, a user changes levels by changing an orientation or angle of the user's finger in a direction into the display 103. In these examples, the user changes levels by rotating the user's finger toward the display 103. The user selects items within a particular level by maintaining the orientation of the user's finger and changing a position of the user's finger with the orientation maintained.

In implementations where an image region is divided into rows and columns, or a three-dimensional image region is divided into rows, columns, and layers, the divisions may be dynamically adjusted so that the division that includes the fingertip is enlarged. Enlarging the division including the fingertip may reduce the possibility of a user inadvertently switching layers while attempting to switch rows or columns, or inadvertently switching columns while attempting to switch rows.

Figure 13A:
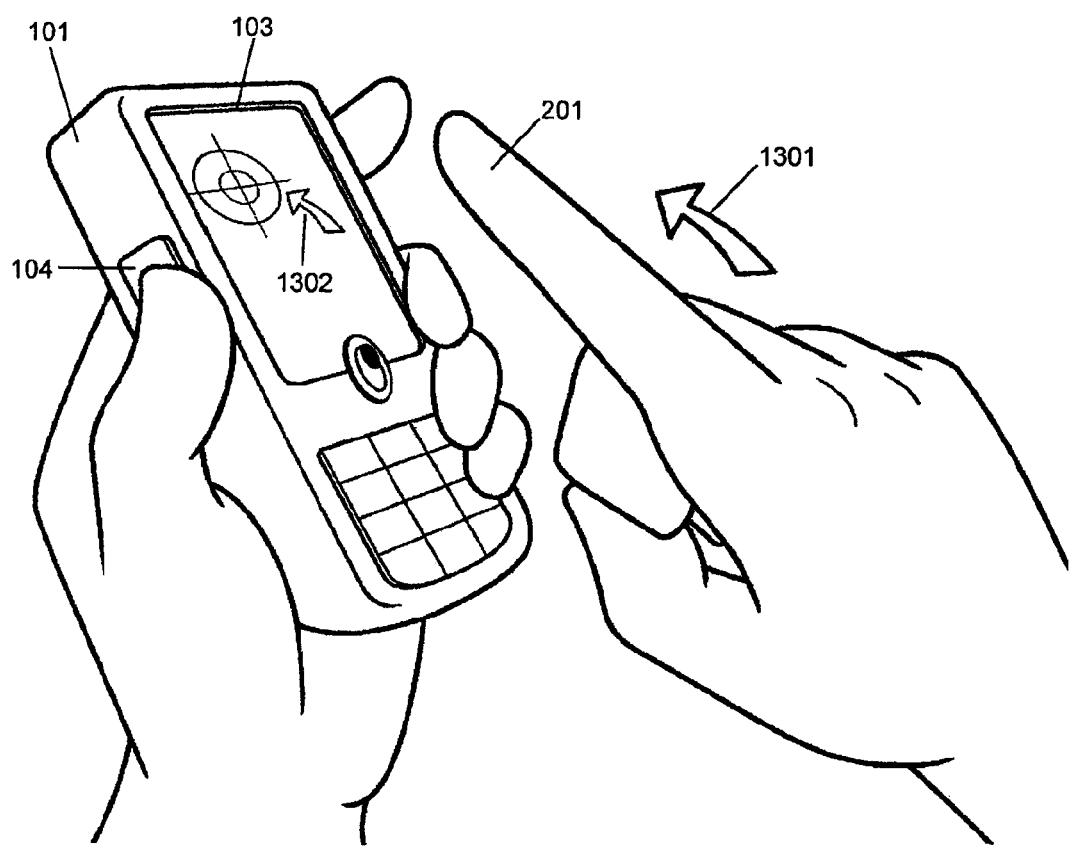
FIG. 13A illustrates an example of a display image of a game displayed on a display screen.

Referring to FIG. 13A, a game is displayed on the display 103. Movements 1301 of the finger 201 are mapped to movements 1302 within the game. In this implementation, the described techniques are adapted to enable a user to control a shooting game. For example, a fingertip position is mapped to a targeting function. In an implementation of a finger controlled shooting game, a fingertip position relative to an image region is mapped to a target position relative to a display region.

Figure 13B:
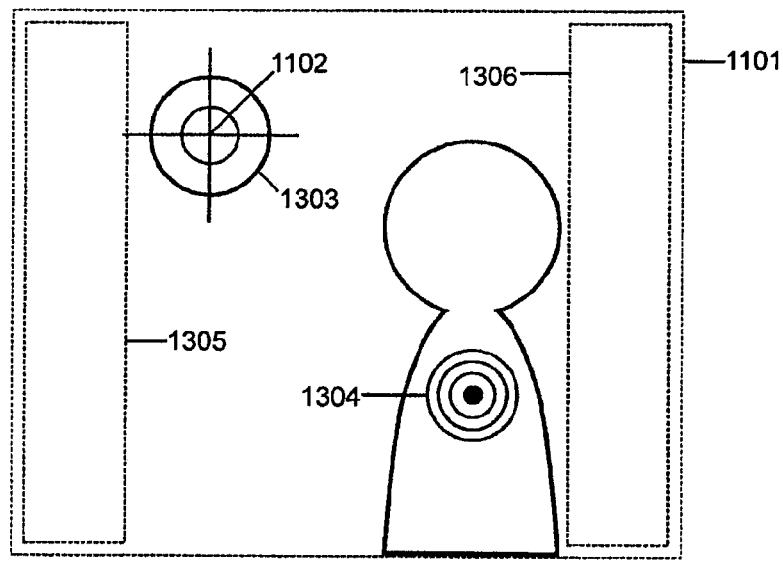
FIG. 13B illustrates an example of a finger-controlled shooting game that includes a first-person view.

FIG. 13B depicts an example of a finger-controlled shooting game that includes a first-person view. A display region 1101 is illustrated and a targeting image 1303 (e.g., a cross hair) is displayed as an indictor at an indicator position 1102 corresponding to a fingertip position. A target image 1304 also is displayed. The user may move his finger to position the targeting image 1303 over the target image 1304.

The user may press the button 104 or a key on the keypad 105 to activate a shooting function. In another implementation, the user may perform a gesture to activate a shooting function. The gesture may be performed and detected as described above.

A finger controlled shooting game may render a first-person view, for example, as illustrated in FIG. 13B. The user is able to change the view within a virtual environment. The view scrolls (or rotates) left if the user moves his finger so that the indicator position 1102 is moved within a sub-region 1305 in the left part of the display region 1101. The view scrolls (or rotates) right if the user moves his finger so that the indicator position 1102 is moved within a sub-region 1306 in the right part of the display region 1101. Similarly, a game scrolls (or rotates) upwards if the user moves his finger so that the indicator position 1102 is moved within a sub-region (not shown) in the upper part of the display region 1101, and a game scrolls (or rotates) downwards if the user moves his finger so that the indicator position 1102 is moved within a sub-region (not shown) in the lower part of the display region 1101. A game moves forward (or zooms-in) if the user moves his finger so that the distance of the fingertip from the camera is closer than a predefined threshold. A game moves backward (or zooms-out) if the user moves his finger so that the distance of the fingertip from the camera is further than a predefined threshold.

In another implementation, in a finger controlled shooting game having a first-person view, the user changes the view within a virtual environment by pressing the button 104, a key on the keypad 105, a directional pad, or a joystick.

In a further implementation, in a finger controlled shooting game, the finger position controls the view within a virtual environment. In this implementation, a targeting image may be stationary or controlled by an automatic function. In one example, a velocity is calculated as the difference in position of a fingertip position within an image region (or a three-dimensional image region) relative to a center position within an image region (or a three-dimensional image region). In another example, a velocity is calculated as the difference in position of a fingertip position within an image region (or a three-dimensional image region) relative to the nearest part on the border of a sub-region centered within an image region (or a three-dimensional image region), where the sub-region represents a "dead-zone". A horizontal component of the velocity is applied to the view point within a virtual environment, such that the view of the virtual environment is horizontally rotated (or scrolled). A vertical component of velocity is applied to the view point within a virtual environment, such that the view of the virtual environment is vertically rotated (or scrolled). A distance component of velocity is applied to the view point within a virtual environment, such that the position of the virtual view point is translated in the virtual environment along the current forward looking trajectory (or zoomed).

Figure 13C:
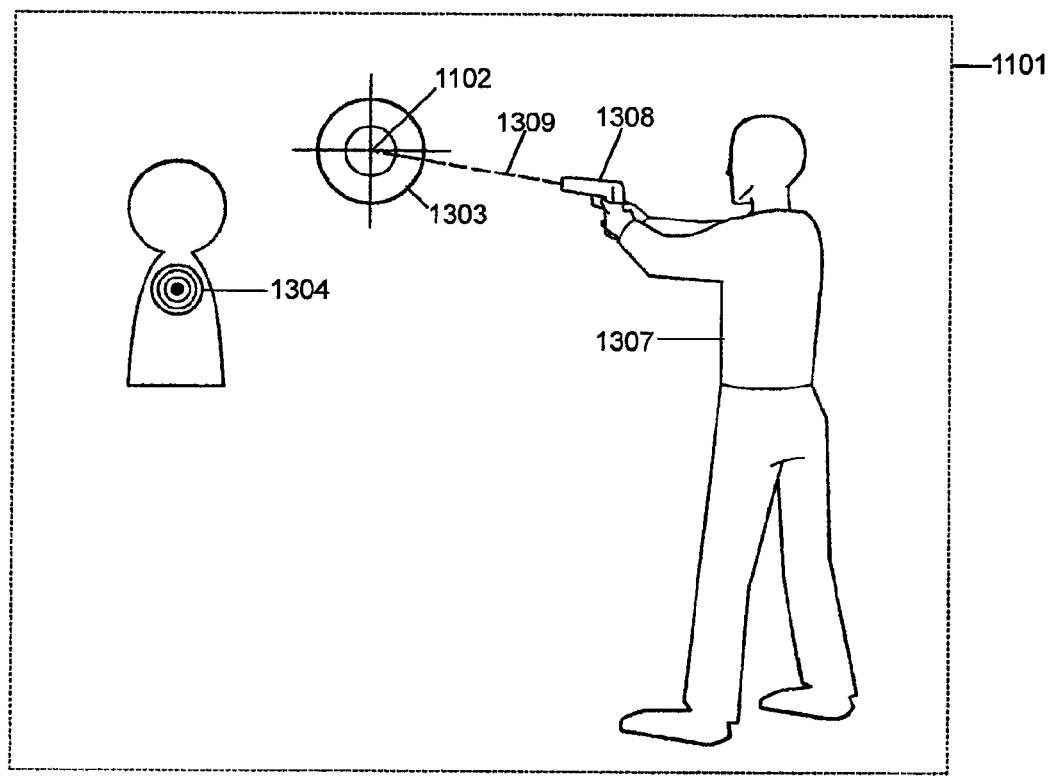
FIG. 13C illustrates an example of a finger-controlled shooting game that includes a third-person view.

FIG. 13C illustrates an example of a finger controlled shooting game that includes a third-person view. In this example, a player image 1307 is rendered on the display 103. A weapon image 1308 is rendered with an orientation such that the weapon trajectory 1309 is aligned to the indicator position 1102. As the user moves his finger, the weapon image 1308 and weapon trajectory 1309 tracks the indicator position 1102. In some configurations, the weapon trajectory 1309 corresponds to a direction in which a user points with the user's finger such that changing an orientation of the user's finger changes the weapon trajectory 1309.

In another implementation, in a finger controlled shooting game having a third-person view, the user moves the player image 1307 by pressing the button 104, a key on the keypad 105, a directional pad, or a joystick. A finger controlled shooting game may take a variety of forms. A target image 1304 and a player image 1307 may represent, for example, a space ship, a vehicle, a soldier, an alien, a monster, a cartoon character, a hunter and prey, etc.

In another implementation, user input techniques are provided for scrolling and zooming over an image. An image may include a photograph, a map, or any other type of image. A map may be displayed where a scale determines the level of detail that is rendered. For example, a "zoomed-out" map displays locations of cities and a "zoomed-in" map displays individual streets.

A process of zooming (e.g., changing the scale of) an image uses the distance of a finger from a camera to control a scale or "zoom" of an image. In implementations of a system where a finger is held above a device, as shown in FIG. 3A, distances near to a camera correspond to a large scale (i.e., zoomed in), while distances further from the camera correspond to a small scale (i.e., zoomed out).

In implementations of a system where a finger is held below a device, as shown in FIG. 3B, distances near to a camera may correspond to a small scale (i.e., zoomed out), while distances further from the camera may correspond to a large scale (i.e., zoomed in). On the other hand, distances near to a camera may correspond to a large scale (i.e., zoomed in), while distances further from the camera may correspond to a small scale (i.e., zoomed out). A user may select a preferred configuration and the preferred configuration may be applied for the user.

In an implementation of mapping the distance of a finger from a camera to control a scale or "zoom" of an image, the distance component of a three-dimensional image region is mapped to a size (or "zoom") range of an image. A distance component of a fingertip position relative to a three-dimensional image region is mapped to a size (or "zoom") of an image relative to a size (or "zoom") range of an image.

In another implementation, a process of scrolling an image is achieved using the finger position to scroll (or "pan") an image. A fingertip position within an image region 1001 is mapped to a position of a display region of an image that is rendered to a display 103. Moving the finger causes the display region of the image rendered to the display 103 to move, thereby scrolling or "panning" the image.

In a further implementation, a process of scrolling and zooming an image maps an image region 1001 to a range within an image, where the scrollable range within the image is dependent on the zoom level. For example, a user moves a finger in a plane parallel to a display to scroll through an entire image and, once the desired part of the image is centered on the display, a user moves the finger in a direction perpendicular to the display to "zoom-in". Once "zoomed-in", a user moves a finger in a plane parallel to the display to scroll through a part of the image. For a small scale (i.e., zoomed out), the scrollable range is defined to include the entire image, so that all parts of the image are displayed by scrolling an image. For a large scale (i.e., zoomed in), the scrollable range is defined to include a part of the image, so that a zoomed part of an image may be scrolled with precision. The scrollable range may be linearly proportional to the scale.

In another implementation, user input techniques are provided for navigating within a virtual environment. A virtual environment may be a part of a game, including but not limited to the game types discussed above. An application or game renders a virtual environment to the display using computer graphic techniques.

Navigation within a virtual environment permits movement within a virtual three-dimensional space and a system provides user input to control navigation within the virtual three-dimensional space. For example, a velocity is calculated as the difference in position of a fingertip position within an image region (or a three-dimensional image region) relative to a center position within an image region (or a three-dimensional image region). In another example, a velocity is calculated as the difference in position of a fingertip position within an image region (or a three-dimensional image region) relative to the nearest part on the border of a sub-region centered within an image region (or a three-dimensional image region), where the sub-region represents a "deadzone". After calculating a velocity, a horizontal component of the velocity is applied to the view point within a virtual environment, such that the view of the virtual environment is horizontally rotated (or scrolled). A vertical component of velocity is applied to the view point within a virtual environment, such that the view of the virtual environment is vertically rotated (or scrolled). A distance component of the velocity is applied to the view point within a virtual environment, such that the position of the virtual view point is translated in the virtual environment along the current forward looking trajectory (or zoomed).

In another implementation, user input techniques are provided to enable a user to position and rotate a virtual object. In this implementation, an application or game renders a virtual object to the display using computer graphic techniques. For example, a user rotates a virtual object by moving a finger in a plane parallel to a display. In this example, an image region 1001 is mapped to a range of rotation and a fingertip position within an image region is mapped to an angle within a range of rotation. In another example, a user "zooms-in" and "zooms-out" by moving a finger in a direction perpendicular to the display. In this example, the distance of the fingertip from the camera is mapped to a scale of the virtual object.

The method of tracking a finger position and orientation may be used in applications and games other than those described above. In addition, described techniques of providing user input may be used in any device that includes a camera or other imaging device.

Implementations may include, for example, a process, a device, or a device for carrying out a process. For example, implementations may include one or more devices configured to perform one or more processes. A device may include, for example, discrete or integrated hardware, firmware, and software. A device may include, for example, a computing device or another computing or processing device, particularly if programmed to perform one or more described processes or variations thereof. Such computing or processing devices may include, for example, a processor, an integrated circuit, a programmable logic device, a personal computer, a personal digital assistant, a game device, a cell phone, a calculator, and a device containing a software application.

Implementations also may be embodied in a device that includes one or more computer readable media having instructions for carrying out one or more processes. The computer readable media may include, for example, a storage device, memory, and formatted electromagnetic waves encoding or transmitting instructions. The computer readable media also may include, for example, a variety of non-volatile or volatile memory structures, such as, for example, a hard disk, a flash memory, a random access memory, a read-only memory, and a compact diskette. Instructions may be, for example, stored in hardware, firmware, software, and in an electromagnetic wave.

Thus, the computing device may represent an implementation of a computing device programmed to perform a described implementation, and the storage device may represent a computer readable medium storing instructions for carrying out a described implementation.

A number of implementations have been described. Nevertheless, it will be understood that various modifications may be made. Accordingly, other implementations are within the scope of the following claims.

What is claimed is:

1. A computer-implemented method comprising:
   detecting an orientation of a finger of a user's hand in an image of the user's hand interacting with an electronic device using an anatomical model of a finger;
   mapping the detected orientation to a control input; and
   controlling an application based on the control input.

2. The method of claim 1, further comprising detecting a position of the finger of the user's hand in the image of the user's hand interacting with the electronic device, wherein the control input is mapped based on the detected position.

3. The method of claim 2, wherein:
   the control input defines a position and an orientation in a virtual environment that corresponds to the detected position and detected orientation of the finger; and
   controlling the application based on the control input comprises:
   controlling a virtual object in the virtual environment to move to the position and the orientation in the virtual environment that corresponds to the detected position and detected orientation of the finger; and rendering a display of the virtual object at the position and the orientation in the virtual environment that corresponds to the detected position and detected orientation of the finger.

4. The method of claim 1, wherein detecting the orientation of the finger of the user's hand in the image of the user's hand interacting with the electronic device using the anatomical model of the finger comprises identifying a first part of the finger that corresponds to the fingertip, identifying a second part of the finger that corresponds to a base of the finger, calculating a vector between the first part of the finger and the second part of the finger, and determining the orientation of the finger based on the vector.

5. The method of claim 1, wherein detecting the orientation of the finger of the user's hand in the image of the user's hand interacting with the electronic device using the anatomical model of the finger comprises:

acquiring an image of the finger, and edge processing the image.

6. The method of claim 5, further comprising segmenting the image in scanlines having an orientation that is substantially perpendicular to the finger.

7. The method of claim 1, further comprising detecting contours around the finger.

8. The method of claim 7, wherein the contours around the finger are detected by calculating a gradient of image intensity within the image and identifying at least one of local minima and local maxima in the gradient of image intensity.

9. The method of claim 1, wherein detecting the orientation of the finger of the user's hand in the image of the user's hand interacting with the electronic device using the anatomical model of the finger comprises identifying an area of the image that corresponds to creases in skin of the finger and ignoring the identified area of the image that corresponds to the creases in the skin of the finger in detecting the finger within the image.

10. The method of claim 1, wherein detecting the orientation of the finger of the user's hand in the image of the user's hand interacting with the electronic device using the anatomical model of the finger comprises selecting an object in the image as the finger based on a size of the object, a shape of the object, and whether the object intersects a border of the image.

11. The method of claim 1 wherein detecting the orientation of the finger using the anatomical model comprises detecting the orientation of the finger using an anatomical model of a finger oriented in a plane parallel to a display of the electronic device, the anatomical model being a model of a finger extending from a base of the finger to a tip of the finger.

12. The method of claim 1, wherein the anatomical model of the finger includes typical features of fingers in images.

13. The method of claim 1, wherein detecting the orientation of the finger includes:

processing the image into scanlines, wherein each scanline represents a cross-section of the finger;

linking one or more scanline segments with one or more neighboring scanline segments based on whether the one or more scanline segments overlap with the one or more neighboring scanline segments; and using the anatomical model to select a set of linked scanline segments as the finger.

14. A device comprising:

an image detector configured to detect an orientation of a finger of a user's hand in an image of the user's hand interacting with an electronic device using an anatomical model of a finger; and a processor configured to map the detected orientation to a control input and control an application based on the control input.

15. The device of claim 14, wherein the image detector is disposed in a mobile phone, a portable video game system, a portable music player, a personal data assistant, a remote control or a digital camera.

16. A non-transitory computer readable medium comprising a computer program product, the computer program product comprising instructions that, when executed, operate to cause a computer to perform operations comprising:

detecting an orientation of a finger of a user's hand in an image of the user's hand interacting with an electronic device using an anatomical model of a finger;

mapping the detected orientation to a control input; and controlling an application based on the control input.

17. A computer-implemented method comprising:

accessing an image of a user's hand interacting with an electronic device;

identifying an object in the image as a finger of the user's hand based on a size of the object, a shape of the object, and whether the object intersects a border of the image;

determining a position of the object identified in the image as the finger of the user's hand;

mapping the detected position to a control input; and controlling an application based on the control input.

18. The method of claim 17 wherein identifying the object in the image as the finger of the user's hand comprises identifying the object in the image as the finger of the user's hand based on the object having an elongated shape that corresponds to an anatomical model of a finger.

19. The method of claim 17 wherein identifying the object in the image as the finger of the user's hand comprises identifying the object in the image as the finger of the user's hand based on an anatomical model of a finger oriented in a plane parallel to a display of the electronic device, the anatomical model being a model of a finger extending from a base of the finger to a tip of the finger.

20. The method of claim 17, wherein:

mapping the detected position to the control input comprises mapping the detected position to a position in a display region that corresponds to the detected position of the finger; and controlling the application based on the control input comprises moving a displayed indicator to the position in the display region that corresponds to the detected position of the finger.

21. The method of claim 17, wherein:

mapping the detected position to the control input comprises identifying an input control at a position in a displayed user interface that corresponds to the detected position of the finger and determining an operation associated with the identified input control; and controlling the application based on the control input comprises performing the operation associated with the identified input control.

22. The method of claim 17, wherein:

determining the position of the object identified in the image as the finger of the user's hand comprises:

determining a width of the finger in the image, and estimating a depth position of the finger with respect to a camera that captured the image based on the determined width; and the control input is mapped based on the estimated depth position.

23. The method of claim 17, wherein determining the position of the object identified in the image as the finger of the user's hand comprises detecting a part of the finger that corresponds to the fingertip, and determining the position as a centroid of the part of the finger that corresponds to the fingertip.

24. The method of claim 17, further comprising defining an image region within the image such that borders of the image region are spaced apart from borders of the image by a distance of at least one half of an expected fingertip width, wherein the position of the finger is detected within the defined image region.

25. The method of claim 24, wherein a position of the fingertip is mapped to a position on a border of the image region when the fingertip is detected outside of the image region.

26. A device comprising:

a camera configured to capture an image of a user's hand interacting with an electronic device;

a processor configured to:

access the image of the user's hand interacting with the electronic device;

identify an object in the image as a finger of the user's hand based on a size of the object, a shape of the object, and whether the object intersects a border of the image;

determine a position of the object identified in the image as the finger of the user's hand;

map the detected position to a control input; and control an application based on the control input.

27. A non-transitory computer readable medium comprising a computer program product, the computer program product comprising instructions that, when executed, operate to cause a computer to perform operations comprising:

accessing an image of a user's hand interacting with an electronic device;

identifying an object in the image as a finger of the user's hand based on a size of the object, a shape of the object, and whether the object intersects a border of the image;

determining a position of the object identified in the image as the finger of the user's hand;

mapping the detected position to a control input; and controlling an application based on the control input.

28. An apparatus comprising:

means for detecting an orientation of a finger of a user's hand in an image of the user's hand interacting with an electronic device using an anatomical model of a finger;

means for mapping the detected orientation to a control input; and means for controlling an application based on the control input.

* * * * *